(12) United States Patent
Dutta et al.

(10) Patent No.: US 9,561,477 B2
(45) Date of Patent: Feb. 7, 2017

(54) METHODS FOR SYNTHESIZING MICROPOROUS CRYSTALS AND MICROPOROUS CRYSTAL MEMBRANES

(71) Applicant: OHIO STATE INNOVATION FOUNDATION, Columbus, OH (US)

(72) Inventors: Prabir Dutta, Worthington, OH (US); Michael Severance, Columbus, OH (US); Chenhu Sun, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 514 days.

(21) Appl. No.: 14/194,199

(22) Filed: Feb. 28, 2014

(65) Prior Publication Data

US 2014/0241981 A1    Aug. 28, 2014

Related U.S. Application Data

(60) Provisional application No. 61/770,465, filed on Feb. 28, 2013.

(51) Int. Cl.
  *C01B 39/54*    (2006.01)
  *C01B 39/02*    (2006.01)
  (Continued)

(52) U.S. Cl.
  CPC ......... *B01D 71/028* (2013.01); *B01D 67/0051* (2013.01); *B01J 29/082* (2013.01);
  (Continued)

(58) Field of Classification Search
  CPC ... B01J 2229/60; B01J 37/105; B01J 37/0215; B01J 29/82; B01J 29/83; B01J 296/85; B01J 29/40; B01J 29/082; B01J 9/084; C01B 39/02; C01B 39/20; C01B 39/22; C01B 39/24; C01B 39/38; C01B 39/40; B01D 67/0051; B01D 71/028
  See application file for complete search history.

(56) References Cited

U.S. PATENT DOCUMENTS

2012/0012001 A1*   1/2012   Li ..................... B01D 53/228
                                                              95/54

FOREIGN PATENT DOCUMENTS

CN          104876240 A   *   9/2015

OTHER PUBLICATIONS

Vladislav, A. B.; Ilyushin, G. D.; Proserpio, D. M. The Zeolite Conundrum: Why Are There so Many Hypothetical Zeolites and so Few Observed? A Possible Answer from the Zeolite-Type Frameworks Perceived As Packings of Tiles. Chem Mater. 2013, 25, 412-424.

(Continued)

*Primary Examiner* — David M Brunsman
(74) *Attorney, Agent, or Firm* — Meunier Carlin & Curfman LLC

(57) ABSTRACT

A method of making a microporous crystal material, comprising: a. forming a mixture comprising NaOH, water, and one or more of an aluminum source, a silicon source, and a phosphate source, whereupon the mixture forms a gel; b. heating the gel for a first time period, whereupon a first volume of water is removed from the gel and micoporous crystal nuclei form, the nuclei having a framework; and c.(if a membrane is to be formed) applying the gel to a solid support seeded with microporous crystals having a framework that is the same as the framework of the nuclei; d. heating the gel for a second time period. during which a second volume of water is added to the gel; wherein the rate of addition of the second volume of water is between about 0.5 and about 2.0 fold the rate of removal of the first volume of water.

20 Claims, 18 Drawing Sheets

(51) Int. Cl.
| | |
|---|---|
| B01D 71/02 | (2006.01) |
| C01B 39/22 | (2006.01) |
| C01B 39/38 | (2006.01) |
| B01J 29/40 | (2006.01) |
| B01J 37/02 | (2006.01) |
| B01J 29/08 | (2006.01) |
| C01B 39/20 | (2006.01) |
| C01B 39/24 | (2006.01) |
| C01B 39/40 | (2006.01) |
| B01D 67/00 | (2006.01) |

(52) U.S. Cl.
CPC .......... *B01J 29/084* (2013.01); *B01J 29/40* (2013.01); *B01J 37/0215* (2013.01); *C01B 39/02* (2013.01); *C01B 39/20* (2013.01); *C01B 39/22* (2013.01); *C01B 39/24* (2013.01); *C01B 39/38* (2013.01); *C01B 39/40* (2013.01); *C01B 39/54* (2013.01); *B01J 2229/60* (2013.01)

(56) References Cited

OTHER PUBLICATIONS

"Cundy, C. S.; Cox, P. A. The Hydrothermal Synthesis of Zeolites: History andDevelopment from the Earliest Days to the Present Time. Chem. Rev. 2003, 103, 663-702."

Valtchev, V.; Mintova, S.; Dimov, V.; Toneva, A.; Radev, D. Tribochemical Activation of Seeds for Rapid Crystallization of Zeolite Y. Zeolites. 1995, 15, 193-197.

"Cundy, C. S.; Plaisted, R. J.; Zhao, J. P.; Remarkable Synergy Between MicrowaveHeating and the Addition of Seed Crystals in Zeolite Synthesis-A Suggestion Verified. Chem. Commun. 1998, 14, 1465-1466."

Li, Q.; Creaser, D.; Sterte, J. An Investigation of the Nucleation/Crystallization Kinetics of Nanosized Colloidal Faujasite Zeolites. Chem. Mater. 2002, 14, 1319-1324.

Arafat, A.; Janser, J.C.; Ebaid, A. R.; van Bekkum, H. Microwave Preparation of Zeolite Y and ZSM-5. Zeolites. 1993, 12, 162-165.

Pera-Titus, M. Porous Inorganic Membranes for CO2 Capture: Present and Prospects. Chem. Rev. 2014, 114, 1413-1492.

"White, J. C.; Dutta, P.K.; Shqau, K.; Verweij, H. Synthesis of Ultrathin Zeolite YMembranes and their Application for Separation of Carbon Dioxide and Nitrogen Gases. Langmuir. 2010, 26, 10287-10293."

"Krishna, R.; van Baten, J. M. J. In Silico Screening of Zeolite Membranes for CO2Capture. J. Membr. Sci. 2010, 360, 323-333."

Bastani, D.; Esmaeili, N.; Asadollahi, M. Polymeric Mixed Matrix Membranes Containing Zeolites as a Filler for Gas Separation Applications: A Review. J. Ind. Eng. Chem. 2013, 19, 375-393.

"Mintova, S.; Olson, N. H.; Bein, T. Electron Microscopy Reveals the NucleationMechanism of Zeolite Y from Precursor Colloids. Angew. Chem. Int. Ed. 1999, 38, 3201-3204."

Anderson, M. W.; Agger, J. R.; Thornton, J. T.; Forsyth, N. Crystal Growth in Zeolite Y Revealed by Atomic Force Microscopy. Angew. Chem. 1996, 35, 1210-1213.

Nikolakis, V.; Vlacho, D. G.; Tsapatsis, M. Modeling of Zeolite Crystallization: the Role of Gel Microstructure. Micropor. Mesopor. Mat. 1998, 21, 337-346.

Twu, J.; Dutta, P. K.; Kresge, C. T. Raman Spectroscopic Studies of the Synthesis of Faujasitic Zeolites: Comparison of Two Silica Sources. Zeolites. 1991, 11, 672-679.

Holmberg, B. A.; Wang, H.; Norbeck, J. M.; Yan, Y. Controlling Size and Yield of Zeolite Y Nanocrystals Using Tetramethylammonium Bromide. Micropor. Mesopor. Mat. 2003, 59, 13-28.

Lippman, E.; Maegi, M.; Samoson, A.; Tarmak, M.; Englehardt, G. Investigation of the Structure of Zeolites by Solid-State High-Resolution Silicon-29 NMR Spectroscopy. J. Am. Chem Soc. 1981, 103, 4992-4996.

Morales-Pacheco, P.; Alvarez, F.; Bucio, L.; Dominguez, J. M. Synthesis and Structural Properties of Zeolitic Nanocrystals II: FAU-Type Zeolites. J. Phys. Chem. C. 2009, 113, 2247-2255.

Subotic, B. Influence of Autocatalytic Nucleation on Zeolite Crystallization Processes. ACS Symposium series, 1989, 398, 110-123.

Valtchev, V. P.; Bozhilov, K. N.; Evidences for Zeolite Nucleation at the Solid-Liquid Interface of Gel Cavities. J. Am. Chem. Soc. 2005, 127, 16171-16177.

Knops-Geritis, P-P.; DeVos, D. E.; Feijen, E. J. P., Jacobs, P. A. Raman Spectroscopy on Zeolites. Microporous Mater. 1997, 8, 3-17.

Fan, F.; Feng, Z.; Li, C. UV Raman Spectroscopic Study on the Synthesis Mechanism and Assembly of Molecular Sieves. Chem. Soc. Rev. 2010, 39, 4794-4801.

Dutta, P. K.; Shieh, D. C.; Puri, M. Raman Spectroscopic Study of the Synthesis of Zeolite Y. J. Phys. Chem. 1987, 91, 2332-2336.

Fan, F.; Feng, Z.; Li, G.; Sun, K.; Ying, P.; Li, C. In Situ UV Raman Spectroscopic Studies on the Synthesis Mechanism of Zeolite X. Chem. Eur. J. 2008, 14, 5125-5129.

Valtchev, V.; Rigolet, S.; Bozhilov, K. N. Gel Evolution in a FAU-type Zeolite Yielding System at 90° C. Micropor. Mesopor. Mat. 2007, 101, 73-82.

Ge, Q.; Wang, Z.; Yan, Y. High-Performance Zeolite NaA Membranes on Polymer-Zeolite Composite Hollow Fiber Supports. J. Am. Chem. Soc. 2009, 131, 17056-17057.

Lassinantti, M.; Hedlund, J.; Sterte, J. Faujasite-Type Films Synthesized by Seeding. Micropor. Mesopor. Mat. 2000, 38, 25-34.

Sandstrom, L.; Palomino, M.; Hedlund, J. High Flux Zeolite X Membranes. J. Membr. Sci. 2010, 354, 171-177.

Weh, K.; Noack, M.; Sieber, I.; Caro, J. Permeation of Single Gases and Gas Mixtures Through Faujasite-Type Molecular Sieve Membranes. Micropor. Mesopor. Mat. 2002, 54, 27-36.

Sato, K.; Sugimoto, K.; Nakane, T. Synthesis of Industrial Scale NaY Zeolite Membranes and Ethanol Permeating Performance in Pervaporation and Vapor Permeation up to 130° C. and 570 kPa. J. Membr. Sci. 2008, 310, 161-173.

Kita, H.; Inoue, T.; Asamura, H.; Tanaka, K.; Okamoto, K. NaY Zeolite Membrane for the Pervaporation Separation of Methanol-Methyl Tert-Butyl Ether Mixtures. Chem. Commun. 1997, 1, 45-46.

Li, S.; Tuan, V. A.; Falconer, J. L.; Noble, R. D. X-Type Zeolite Membranes: Preparation, Characterization, and Pervaporation Performance. Micropor. Mesopor. Mat. 2002, 53, 59-70.

Asghari, M.; Mohammadi, T.; Aziznia, A.; Danayi, M. R.; Moosavi, S. H.; Alamdari, R. F.; Agand, F. Preparation and Characterization of a Thin Continuous Faujasite Membrane on Tubular Porous Mullite Support. Desalination. 2008, 220, 65-71.

Kumakiri, I.; Yamaguchi, T.; Nakao, S. Preparation of Zeolite A and Faujasite Membranes from a Clear Solution. Ind. Eng. Chem. Res. 1999, 38, 4682-4688.

Gu, X.; Dong, J.; Nenoff, T. M.; Synthesis of Defect-Free FAU-Type Zeolite Membranes and Separation for Dry and Moist $CO_2/N_2$ Mixtures. Ind. Eng. Chem. Res. 2005, 44, 937-944.

Kita, H.; Fuchida, K.; Horita, T.; Asamura, H., Okamoto, K. Preparation of Faujasite Membranes and their Permeation Properties. Sep. Purif. Technol. 2001, 25, 261-268.

* cited by examiner ated to 50-200° C. for periods of time extending from hours to days. This process has a slow induction period, followed by a more rapid crystallization process. Decreasing the crystallization time for microporous crystals, such as zeolites, is desirable because it can lead to significant cost savings, morphology control (primarily decreasing size of crystals), and increases in the purity of the crystalline phase. Several strategies have been reported to speed up crystallization, and/or shorten the induction time. These include seeding, altered heating profile (higher temperatures typically), multiple heating stages, and microwave radiation.

METHODS FOR SYNTHESIZING MICROPOROUS CRYSTALS AND MICROPOROUS CRYSTAL MEMBRANES

CROSS-REFERENCE TO RELATED APPLICATIONS

This patent application claims priority to U.S. Provisional Patent Application No. 61/770,465 filed Feb. 28, 2013, the contents of which are incorporated herein by reference in their entirety.

STATEMENT REGARDING FEDERALLY SPONSORED RESEARCH

This invention was partially made with government support under Grant No. DE-FE0007632 awarded by the United States Department of Energy. The government has certain rights in the invention.

INTRODUCTION

Molecular sieves are materials with very small holes of precise and uniform size, which are useful for a wide variety of industrial applications including, but not limited to, ion exchange, adsorption, catalysis, and filtration. Many molecular sieves are formed of microporous crystals having frameworks that define pores with diameters less than about 2 nm. Microporous crystals that are useful as molecular sieves include, but are not limited to, aluminosilicates (i.e., zeolites), silicates, aluminophosphates, and silicoaluminophosphate crystals. Zeolites, for example, are microporous, crystalline aluminosilicates with a framework made up of T-O-T (T=Si, Al) bonds that form cages and channels of molecular dimensions. There are over 150 zeolite frameworks that have been synthesized, and in principle, many more are possible. For example, faujasite (FAU) zeolites, which comprise zeolite X and zeolite Y, is one of the industrially most important zeolite frameworks, and finds use in ion-exchange, adsorption and catalysis applications. Zeolite Socony Mobil-5 (ZSM-5), which has the MFI framework, is widely used in the petroleum industry as a heterogeneous catalyst for hydrocarbon isomerization.

Microporous crystals, such as zeolites, are often synthesized using a hydrothermal process, in which the reactants are heated to 50-200° C. for periods of time extending from hours to days. This process has a slow induction period, followed by a more rapid crystallization process. Decreasing the crystallization time for microporous crystals, such as zeolites, is desirable because it can lead to significant cost savings, morphology control (primarily decreasing size of crystals), and increases in the purity of the crystalline phase. Several strategies have been reported to speed up crystallization, and/or shorten the induction time. These include seeding, altered heating profile (higher temperatures typically), multiple heating stages, and microwave radiation.

A potential application of rapid crystallization is for synthesis of microporous crystal membranes. For example, zeolite X/Y is emerging as a promising material to capture carbon dioxide from the flue gas stream of coal burning power plants, as evidenced from recent experimental and theoretical work. However, to be feasible for the actual practice of $CO_2$ capture, along with material performance, the process needs to be cost-effective. Cost of synthesizing microporous crystal membranes can be significantly minimized by using inexpensive polymeric supports in place of conventional inorganic ceramic oxides. Polymeric support materials can be synthesized rapidly and inexpensively using continuous casting technology. If the kinetics of microporous crystal growth can be made compatible with polymer roll-to-roll technology, then polymer supported microporous crystal membranes can be manufactured in a rapid, economical fashion. To make such a technology feasible, microporous crystal membrane growth has to be accomplished in the hour time scale, with ~30 min being ideal. This technology is different from the mixed matrix membranes, which are physical mixtures of microporous crystal and polymer.

SUMMARY

This disclosure provides methods of making microporous crystals and microporous crystal membranes that are substantially faster than other hydrothermal processes known in the art.

In some aspects, the methods of making microporous crystals include forming a mixture comprising NaOH, water, and one or more of an aluminum source, a silicon source, and a phosphate source, whereupon the mixture forms a gel; heating the gel for a first time period, whereupon a first volume of water is removed from the gel; and heating the gel for a second time period, during which a second volume of water is added to the gel, wherein the rate of addition of the second volume of water is between about 0.5 and about 2.0 fold the rate of removal of the first volume of water.

In some aspects, the methods of making microporous crystal membranes include forming a mixture comprising NaOH, water, and one or more of an aluminum source, a silicon source, and a phosphate source, whereupon the mixture forms a gel; heating the gel for a first time period, whereupon a first volume of water is removed from the gel and microporous crystal nuclei form, the nuclei having a framework; applying the gel to a solid support seeded with microporous crystals having a framework that is the same as the framework of the nuclei; and heating the gel for a second time period, during which a second volume of water is added to the gel; wherein the rate of addition of the second volume of water is between about 0.5 and about 2.0 fold the rate of removal of the first volume of water.

This disclosure provides for other aspects and embodiments that will be apparent in light of the following detailed description and accompanying Figures.

$^{27}$Al MAS NMR spectra of the crystalline product of a dehydration-rehydration synthesis protocol, (c) $^{29}$Si{$^1$H}NMR spectra of the crystalline product of a standard hydrothermal synthesis protocol, (d) $^{27}$Al MAS NMR spectra of the crystalline product of a standard hydrothermal synthesis protocol.

Figure 5:
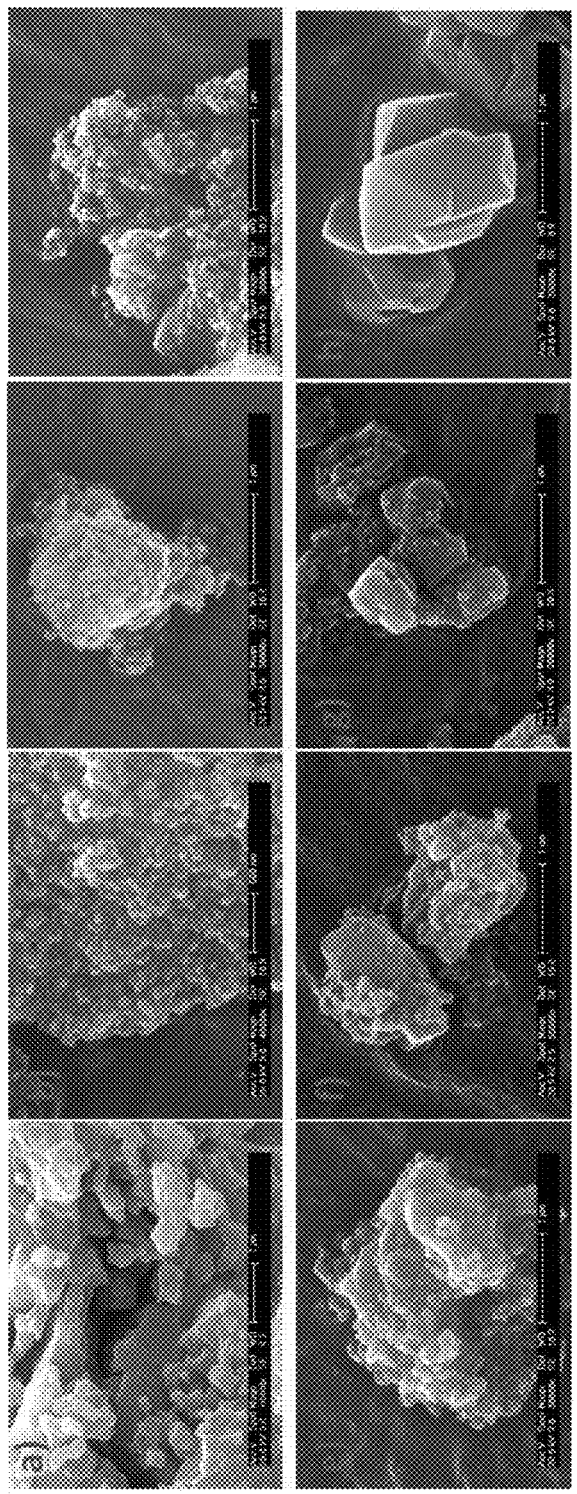

FIG. 5 is a series of SEM images of solids (i.e. crystals) collected from a gel being submitted a dehydration-rehydration synthesis protocol at various times.

Figure 6:
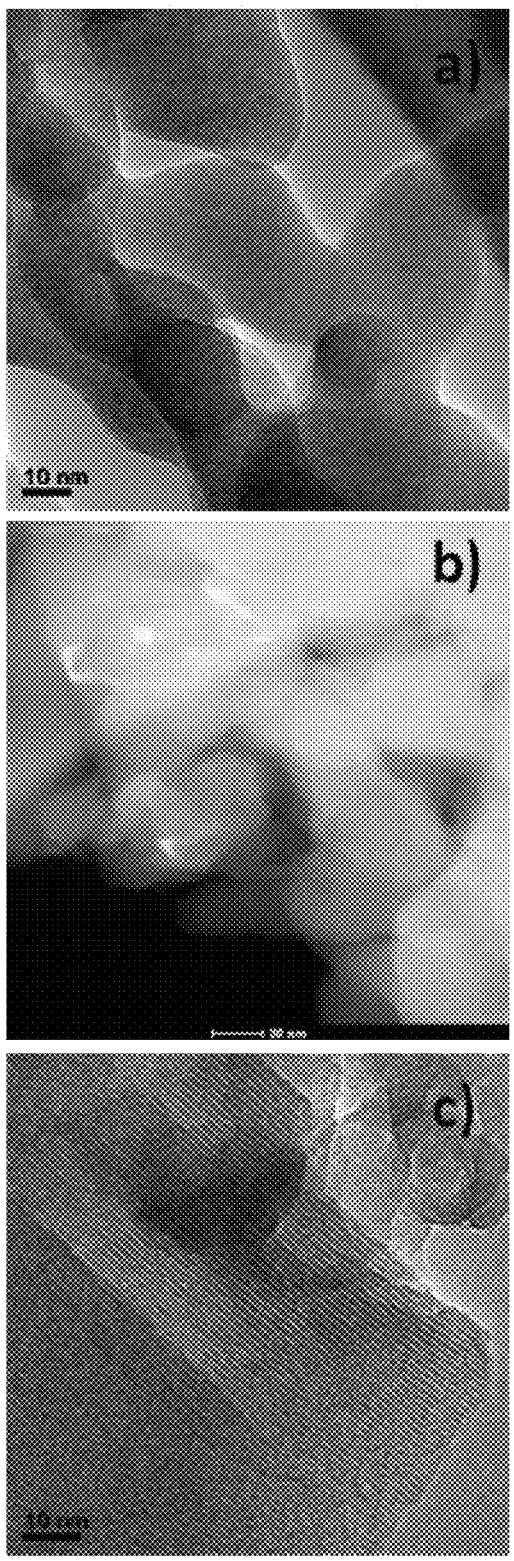

FIG. 6 shows (a) a High-Res TEM image of a sample collected from a gel being submitted to a dehydration-rehydration synthesis protocol at 60 min (b) a Dark-Field TEM image of the same gel after 70 min, and (c) a High-Res TEM image of the same gel at 70 min.

Figure 7:
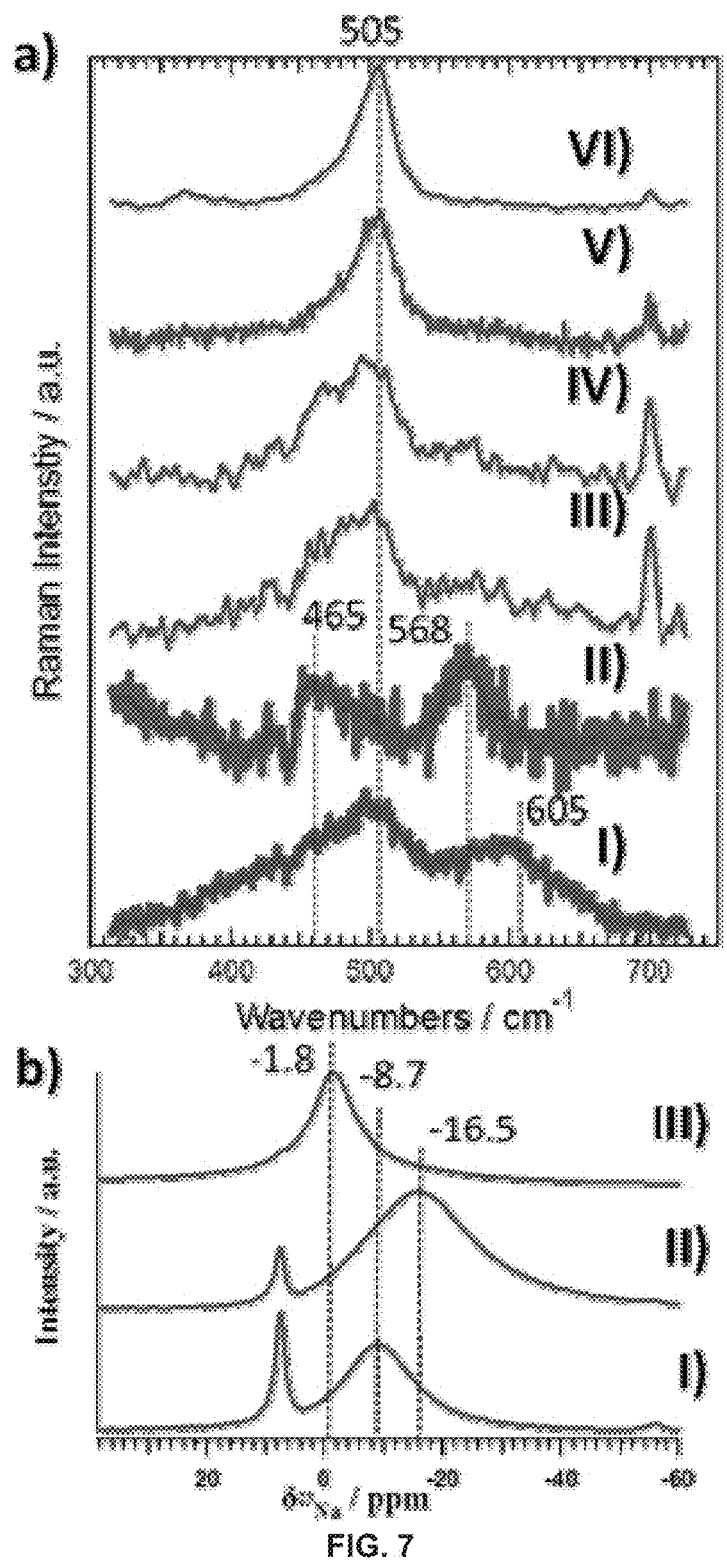

FIG. 7 shows (a) Raman spectra of samples collected from a gel being submitted to a dehydration-rehydration synthesis protocol after (I) 0 min, (II) 60 min, (III) 70 min, (IV) 80 min, (V) 90 min, and (VI) 120 min; (b) $^{23}$Na MAS NMR of samples from the same gel collected at (I) 0 min, (II) 60 min, and (III) 120 min.

Figure 8:
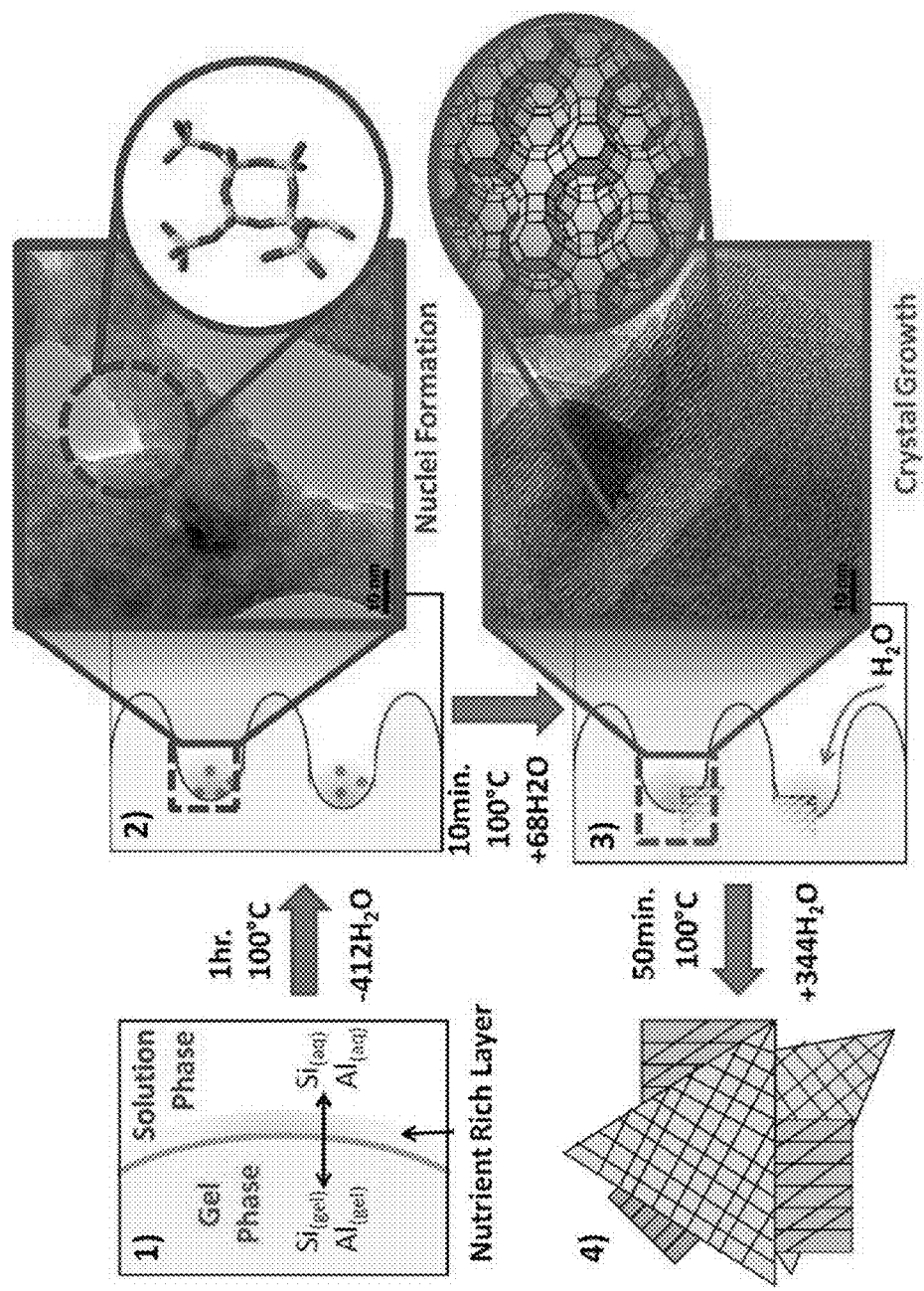

FIG. 8 is a schematic representing the most significant events in the rapid synthesis of microporous crystals under a dehydration-rehydration synthesis protocol.

Figure 9:
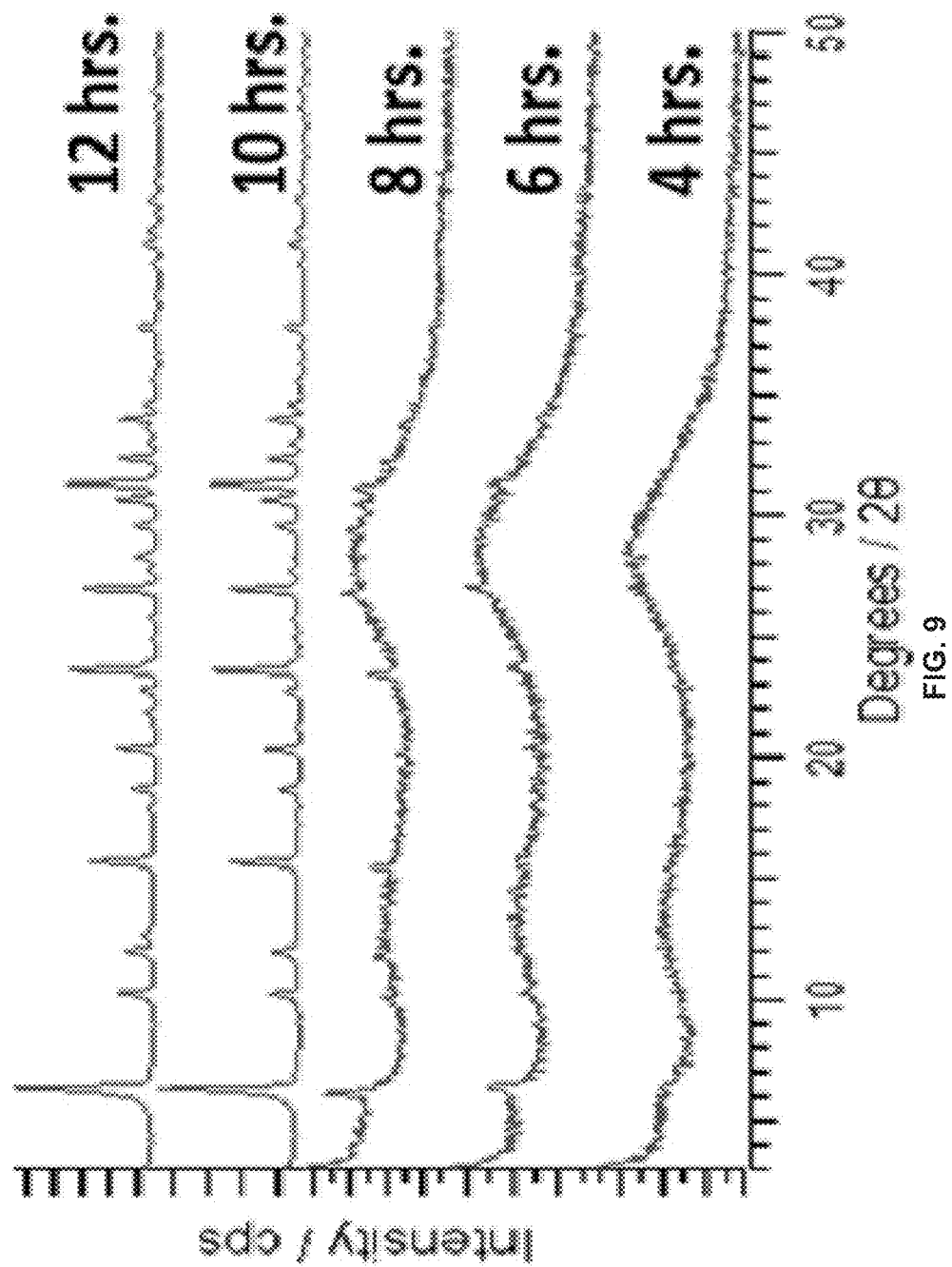

FIG. 9 is a series of XRD patterns for samples collected at various times from a gel being submitted to a standard hydrothermal synthesis protocol.

Figure 10:
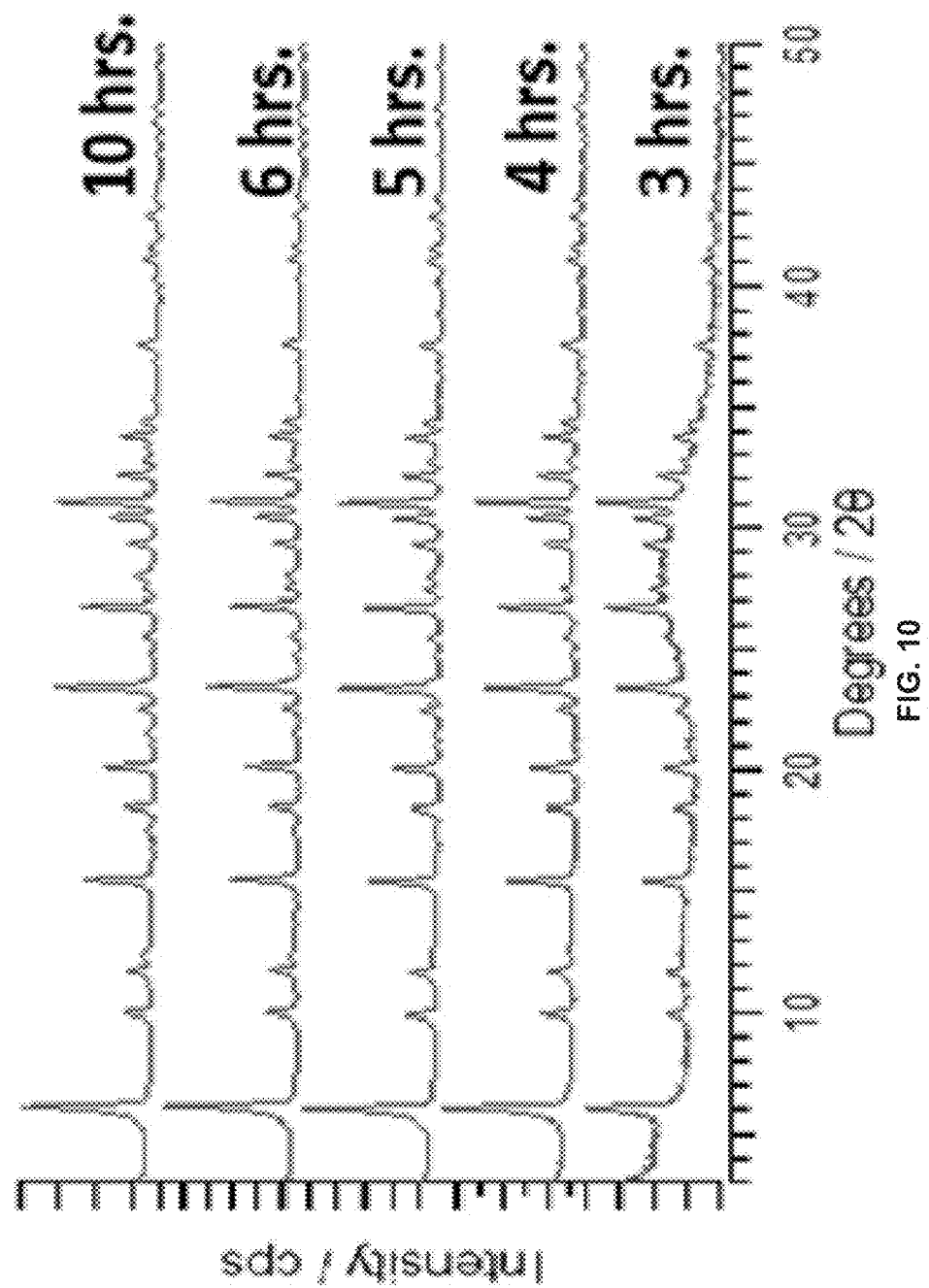

FIG. 10 is a series of XRD patterns for samples collected at various times from a gel being submitted to a dehydration-rehydration synthesis protocol.

Figure 11:
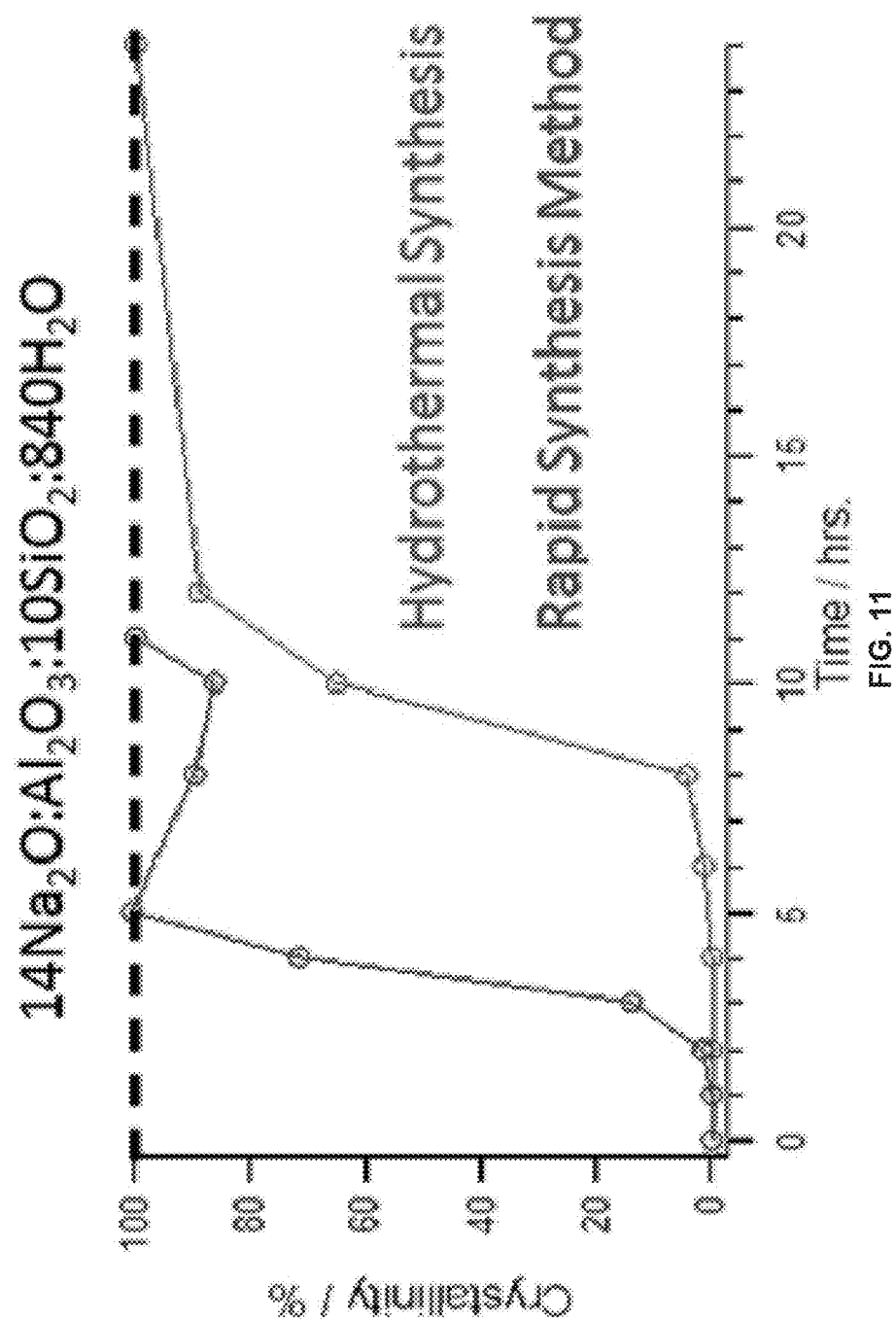

FIG. 11 is a graph showing crystallization for identical aluminosilicate gels submitted to both a dehydration-rehydration synthesis protocol and a standard hydrothermal synthesis protocol.

Figure 12:
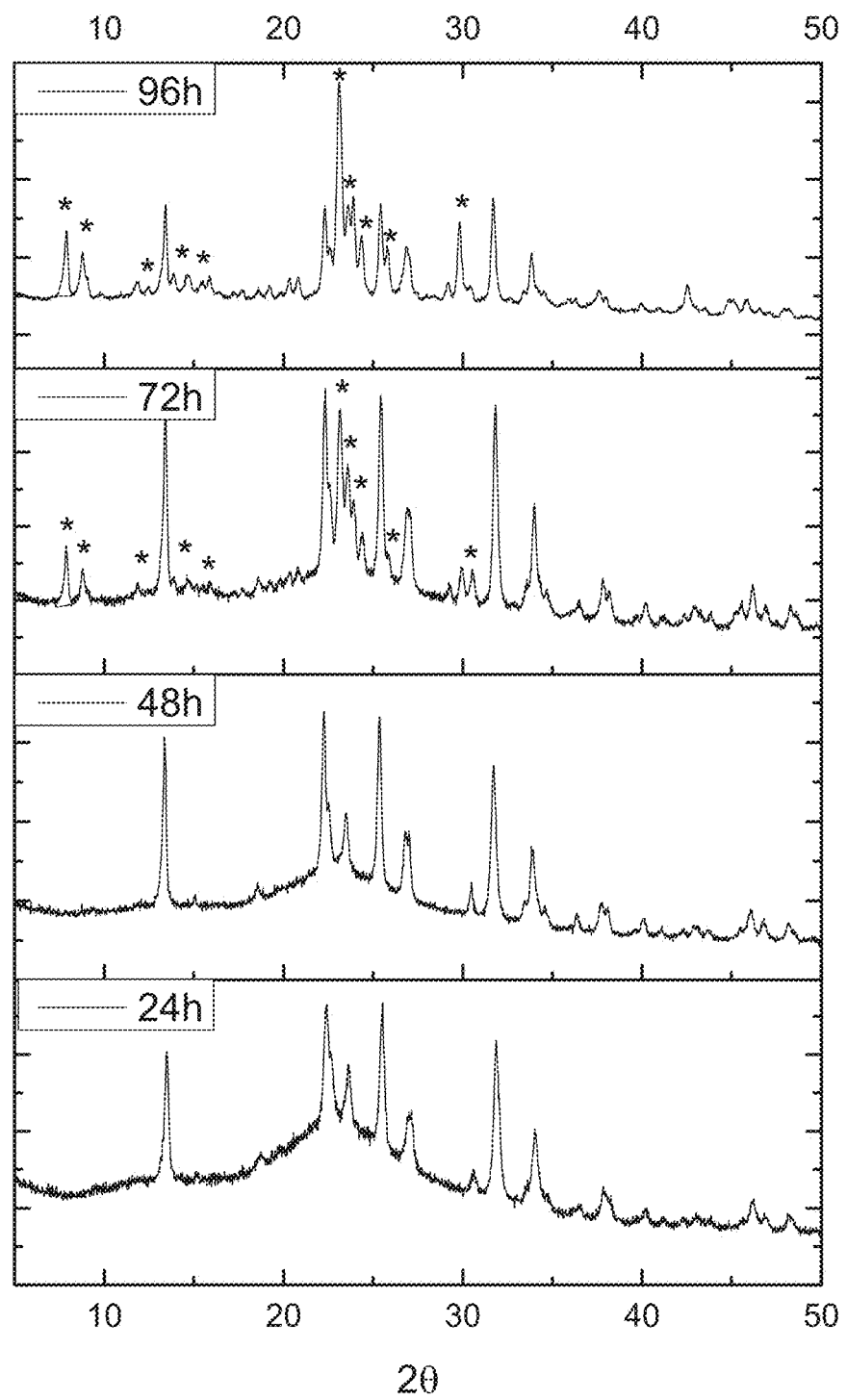

FIG. 12 is a series of XRD patterns for samples collected at various times from a gel being submitted to a standard hydrothermal synthesis protocol.

Figure 13:
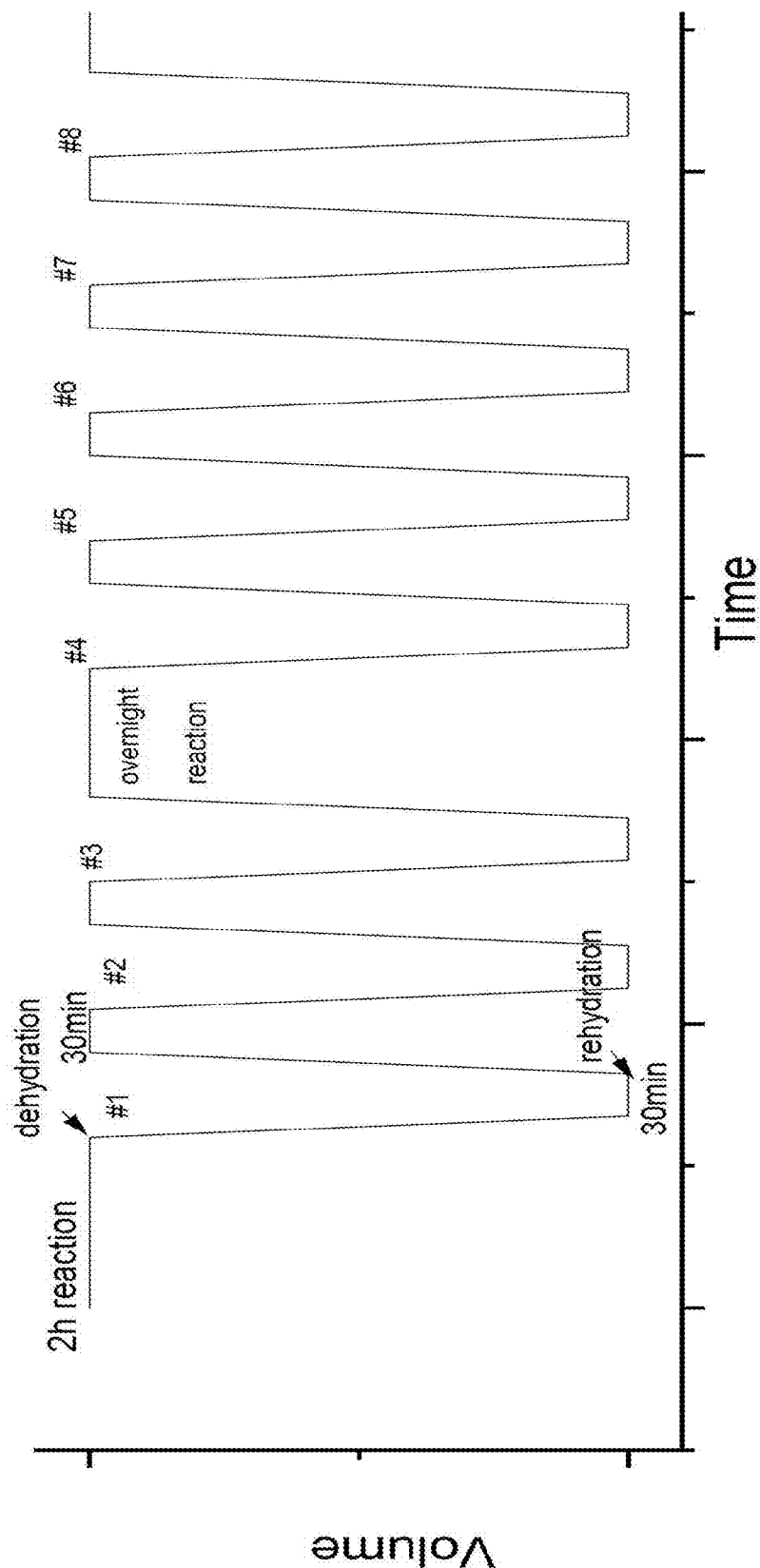

FIG. 13 is a graphical representation of dehydration-rehydration synthesis protocol having multiple dehydration-rehydration cycles.

Figure 14:
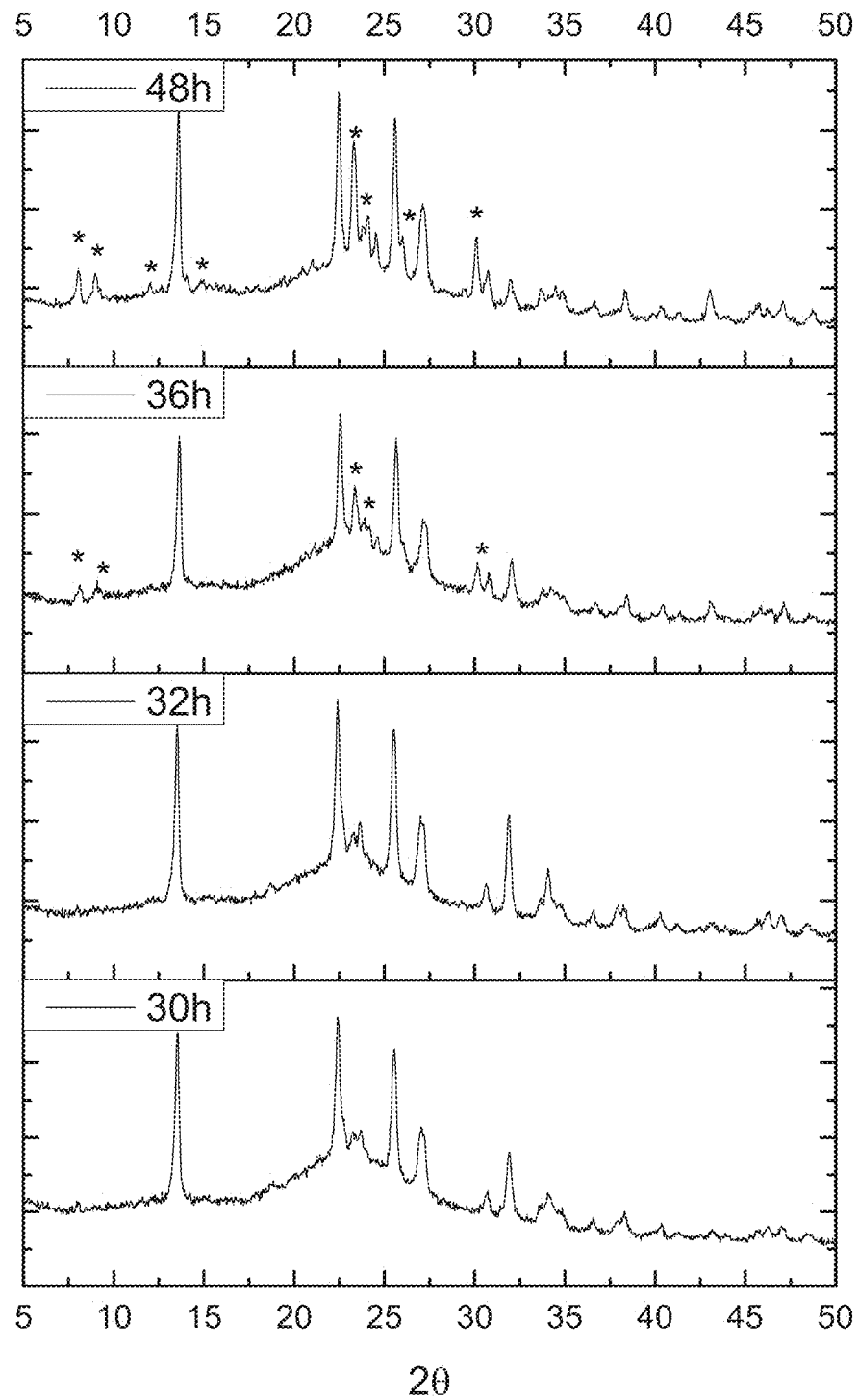

FIG. 14 is a series of XRD patterns for samples collected at various times from a gel being submitted to the dehydration-rehydration synthesis protocol of FIG. 13.

Figure 15:
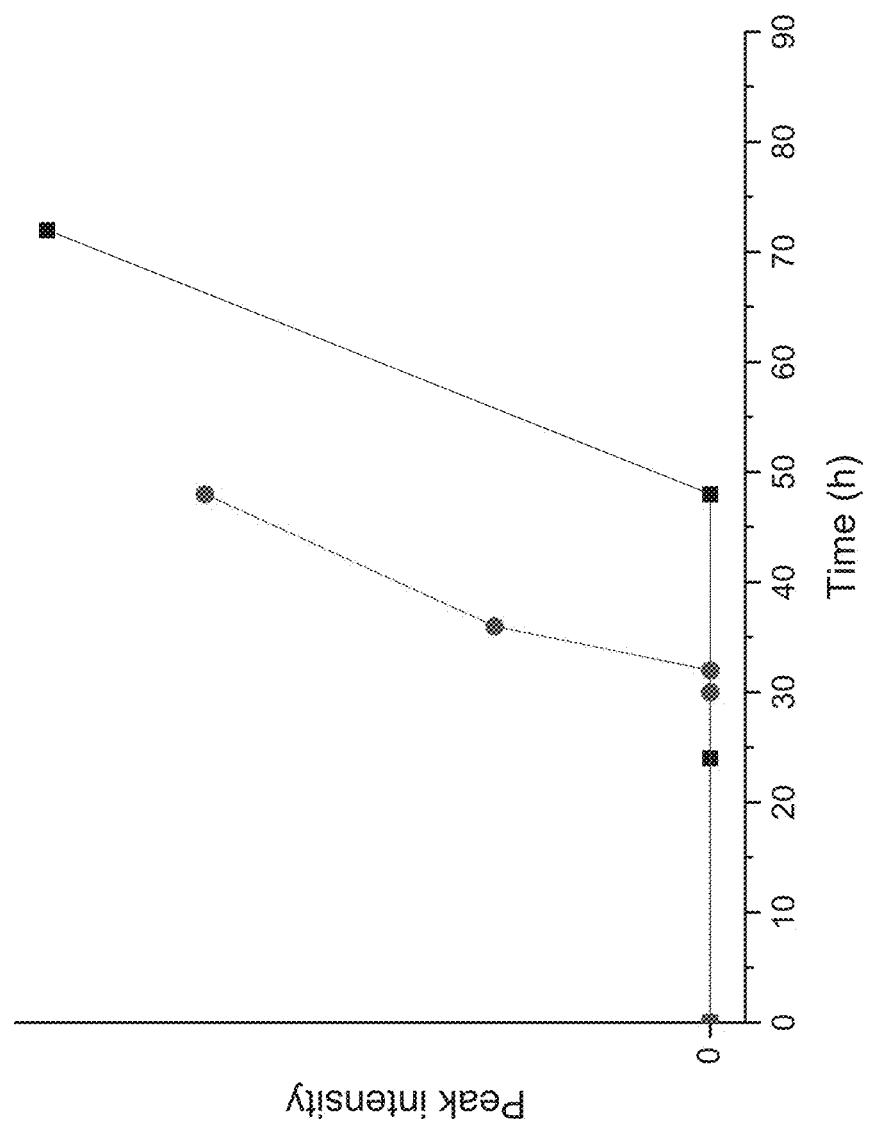

FIG. 15 is a graph showing peak intensity as a function of time for identical aluminosilicate gels submitted to both a dehydration-rehydration synthesis protocol (red circles) and a standard hydrothermal synthesis protocol (black squares).

Figure 16:
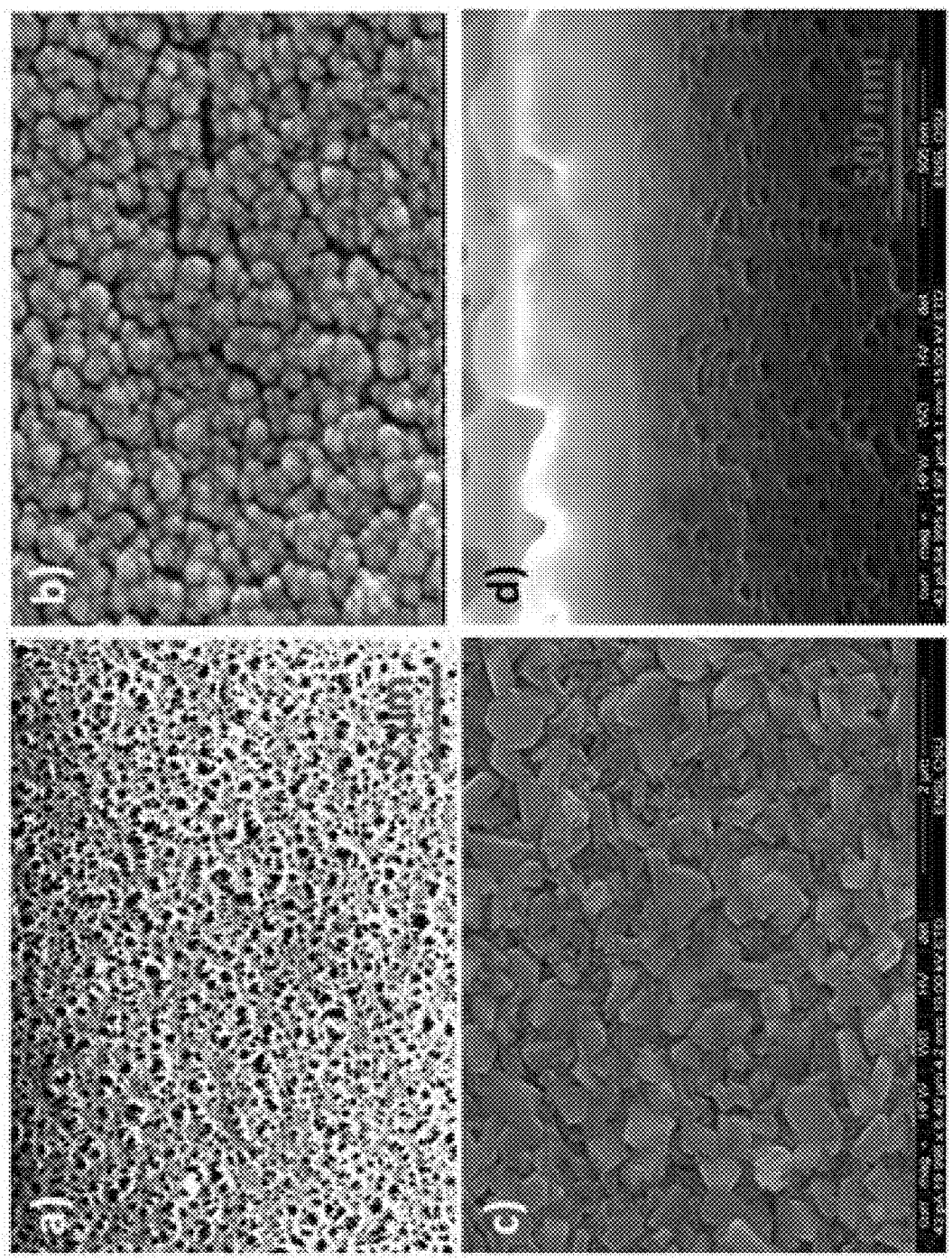

FIG. 16 is a series of SEM images showing (a) PES support surface, (b) microporous crystal seeded PES support surface, (c) surface of a seeded PES support after having had a gel applied and then rehydrated for 1 hr, and (d) its respective cross-sectional view.

Figure 17:
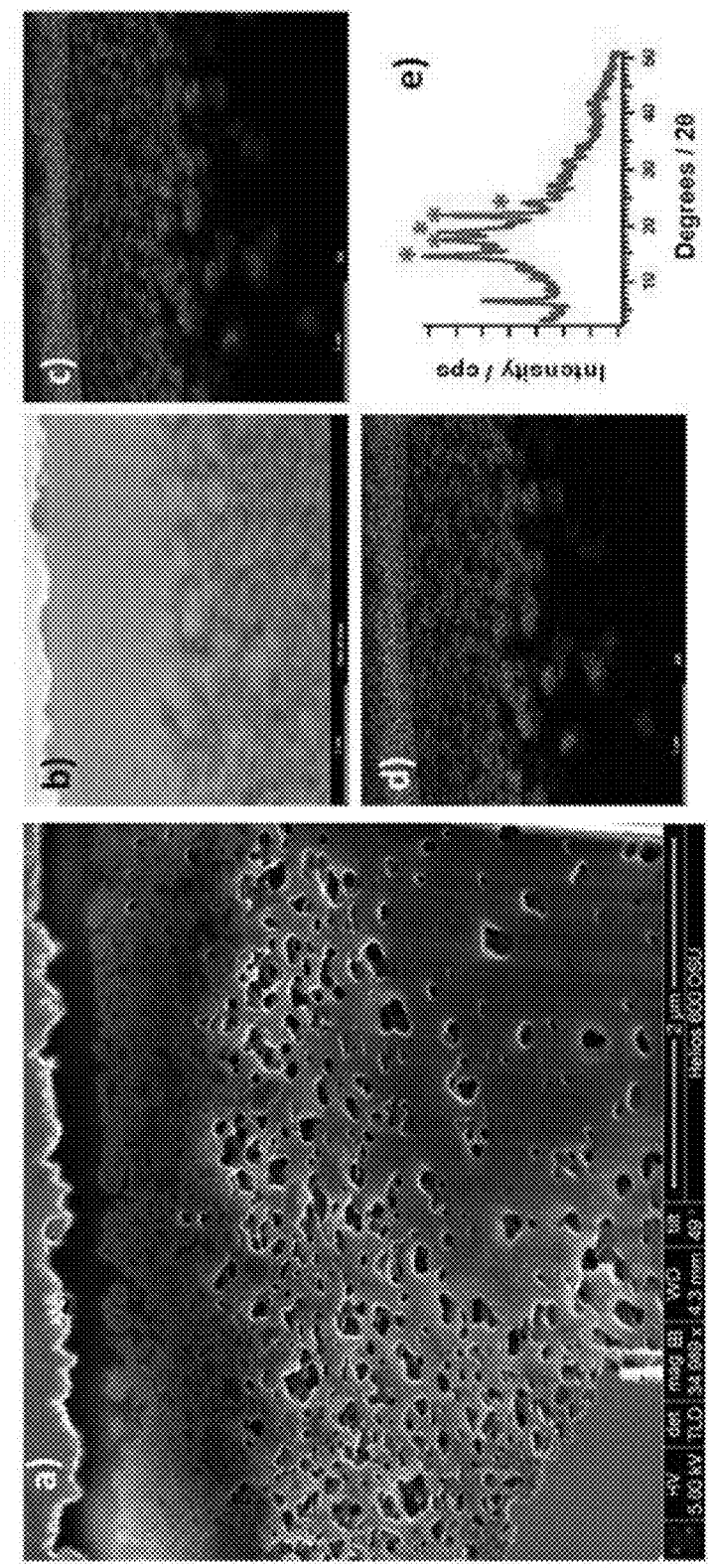

FIG. 17 shows (a) a magnified SEM image of the cross-section from FIG. 16d; (b) the STEM of the same cross section (c) the silicon elemental map of the same cross section, (d) the aluminum elemental map of the same cross-section, and (e) an XRD pattern of the microporous crystal membrane (peaks marked with an asterisk are representative of the PES support).

Figure 18:
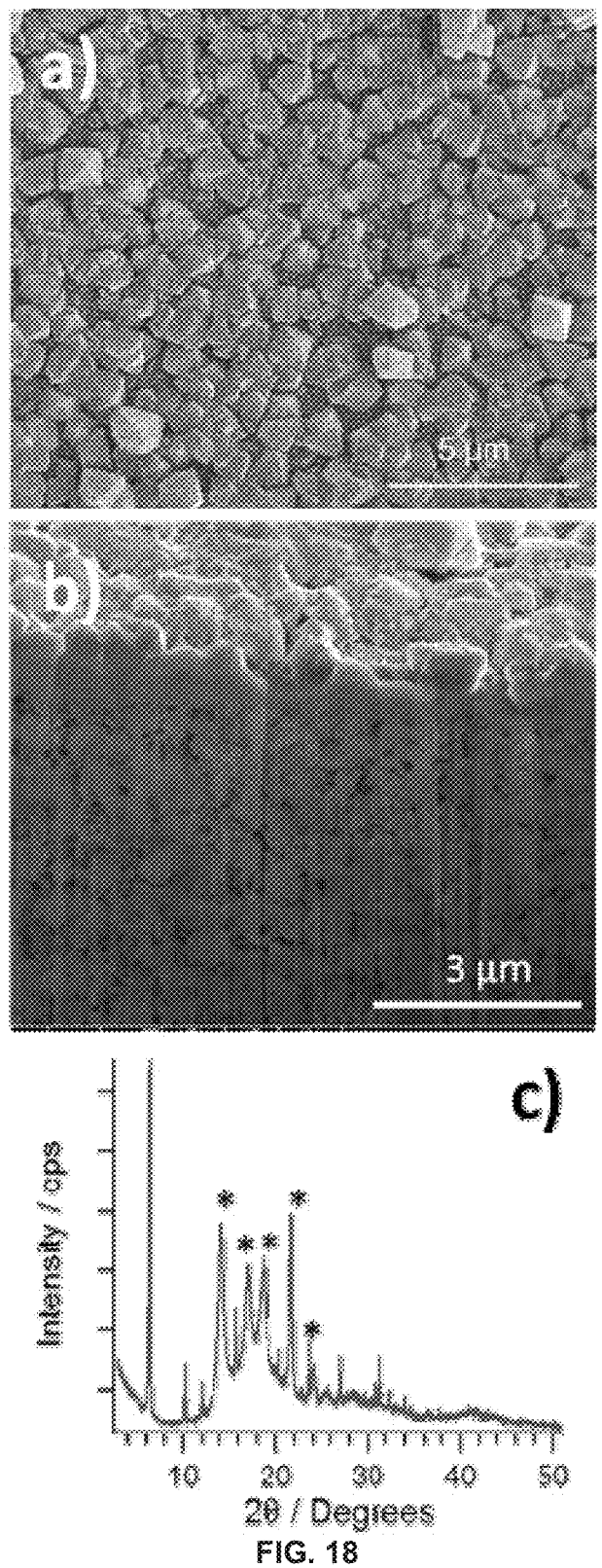

FIG. 18 shows (a) SEM image of the top view of a hydrothermally grown seed layer on a PES support, (b) and its respective cross-sectional image, and (c) XRD pattern of the as-prepared membrane (peaks marked with an asterisk are representative of the PES support).

DETAILED DESCRIPTION

The methods and systems disclosed herein are not limited in their applications to the details of construction and the arrangement of components described herein. The methods and apparatuses are capable of other embodiments and of being practiced or of being carried out in various ways. Also it is to be understood that the phraseology and terminology used herein is for the purpose of description only, and should not be regarded as limiting. Ordinal indicators, such as first, second, and third, as used in the description and the claims to refer to various structures, are not meant to be construed to indicate any specific structures, or any particular order or configuration to such structures. The use of the terms "a" and "an" and "the" and similar referents in the context of describing the invention are to be construed to cover both the singular and the plural, unless otherwise indicated herein or clearly contradicted by context. All methods described herein can be performed in any suitable order unless otherwise indicated herein or otherwise clearly contradicted by context. The terms "comprising," "having," "including," and "containing" are to be construed as open-ended terms (i.e., meaning "including but not limited to") unless otherwise noted. Embodiments described as "comprising" certain features are also contemplated as "consisting essentially of" and "consisting of" said features unless otherwise noted. The use of any and all examples, or exemplary language (e.g., "such as") provided herein, is intended merely to better illuminate the methods and apparatuses disclosed herein and does not pose a limitation on the scope of the methods and apparatuses unless otherwise claimed. No language in the specification, and no structures shown in the drawings, should be construed as indicating that any non-claimed element is essential to the practice of the methods and apparatuses disclosed herein.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration, volume or the like range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Further, no admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein.

This disclosure provides methods of making microporous crystals and microporous crystal membranes that are substantially faster than other hydrothermal processes known in the art. Specifically, it has been discovered that the controlled dehydration and rehydration of sol-gels during synthesis of microporous crystals leads to an overall dramatic increase in the rate of microporous crystal growth. Moreover, the heavily nucleated gels formed during this process provide an ideal starting material for rapidly synthesizing microporous crystal membranes. In fact, the time it takes to synthesize at least some membranes (approximately one hour) is approaching the polymer roll-to-roll fabrication time constraints, and suggests a new application of the microporous crystal synthesis procedure being reported herein.

Methods of Making Microporous Crystals

In some aspects, this disclosure provides methods of making microporous crystals that include forming a reaction mixture comprising NaOH, water, and one or more of an aluminum source, a silicon source, and a phosphate source, whereupon the mixture forms a gel; heating the gel for a first time period, whereupon a first volume of water is removed from the gel; and heating the gel for a second time period, during which a second volume of water is added to the gel, wherein the rate of addition of the second volume of water is between about 0.5 and about 2.0 fold the rate of removal of the first volume of water. In some embodiments, the reaction mixture may further comprise at least one alkali metal cation, alkaline metal cation, amine or quaternary ammonium cation.

The microporous crystals that can be formed according to these methods may include, but are not limited to, aluminosilicate crystals (i.e., zeolites), silicate crystals, aluminophosphate crystals, and silicoaluminophosphate crystals. These crystals may have any framework currently know or hereafter developed. For example, zeolite crystals may have zeolite frameworks including, but not limited to, the ABW, ACO, AEI, AEL, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BST, *BEA, BEC, BIK, BOF, BOG, BOZ, BPH, BRE, BSV, CAN, CAS, CDO, CFI, CGF, CGS, CHA, -CHI, -CLO, CON, CZP, DAC, DDR, DFO, DFT, DOH, DON, EAB, ADI, EMT, EON, EPI, ERI, ESV, ETR, EUO, EZT, FAR, FAU, FER, FRA, GIS, GIU, GME, GON, GOO, HEU, IFO, IFR, IHW, IMF, IRR, ISV, ITE, ITH, ITR, ITT, -ITV, ITW, IWR, IWS, IWV, IWW, JBW, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MRF, MRN, MTT, MTW, MVY, MWW, NAB, NAT, NES, NON, NPO, NPT, NSI, OBW, OFF, OKO, OSI, OSO, OWE, -PAR, PAU, PCR, PHI, PON, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, SSY, STF, STI, *STO, STT, STW, -SVR, SVV, SZR, TER, THO, TOL, TON, TSC, TUN, UEI, EFI, UOS, UOZ, USI, UTL, UWY, VET, VFI, VNI, VSV, WEI, -WEN, YUG, and ZON frameworks. Different microporous crystals having varying crystalline frameworks may be synthesized accordingly, by varying the relative types and proportions of starting materials and/or the reaction conditions. For example, different microporous crystals may be formed by varying the relative ratios of silicon, aluminum, phosphate, and other inorganic and organic species in the reaction mixture. General synthetic methods for preparing different microporous crystals are described in Xu, Ruren, et al., *Chemistry of Zeolites and Related Porous Materials, Synthesis and Structure*, Singapore, Markono Print Media Pte Ltd., 2007, the complete disclosure of which is hereby incorporated by reference in its entirety. In some exemplary embodiments, the microporous crystals may comprise faujasite (zeolite X and Y) having a FAU framework. In other exemplary embodiments, the microporous crystals may comprise ZSM-5, having the MFI framework.

As indicated above, the microporous crystals may be formed by first forming a reaction mixture comprising NaOH, water, and one or more of an aluminum source, a silicon source, and a phosphate source, whereupon the mixture forms a gel (i.e., a sol-gel, or crystallization field). Suitable aluminum sources may include, but are not limited to, sodium aluminate, boehmite, aluminum sulfate, aluminum nitrate, aluminum isopropoxide, aluminum hydroxide, metallic aluminum and combinations thereof. Suitable silicon sources may include, but are not limited to, water glass, sodium silicate, silica gel, colloidal silica, fumed silica, tetraethylorthosilicate, tetramethylorthosilicate, and combinations thereof. Suitable phosphate sources may include, but are not limited to phosphoric acid, a phosphate salt (e.g., sodium phosphate, zinc phosphate, etc.), and combinations thereof. Suitable alkali and alkaline metal cations may include, but are not limited to, lithium, sodium, potassium, calcium, and magnesium, and combinations thereof. Suitable amines and quaternary ammonium cations may include, but are not limited to, propylamine, diaminohexane, triethanolamine, piperidines, tetramethylammonium, tetraethylammonium, tetrapropyl, tetrabutylammonium, and tetraethylpropylammonium, among numerous others.

After the gel has been formed, the gel may be heated for a first time period under dehydrating conditions sufficient to cause a first volume of water to be removed from the gel and to induce rapid crystal nucleation. The microporous crystal nuclei that are formed will have a framework that is dependent on the relative types and proportions of the starting materials in the reaction mixture and/or the reaction conditions. During the first time period, the gel may be heated at a temperature ranging between ambient temperature and about 250° C. For example, the gel may be heated at temperatures greater than about 25° C., greater than about 30° C., such as greater than about 35° C., greater than about 40° C., greater than about 45° C., greater than about 50° C., greater than about 55° C., greater than about 60° C., greater than about 65° C., greater than about 70° C., greater than about 75° C., greater than about 80° C., greater than about 85° C., greater than about 90° C., greater than about 95° C., greater than about 100° C., greater than about 110° C., greater than about 120° C., greater than about 130° C., greater than about 140° C., greater than about 150° C., greater than about 160° C., greater than about 170° C., greater than about 180° C., greater than about 190° C., greater than about 200° C., greater than about 210° C. greater than about 220° C., or greater than about 230° C. The gel may be heated at temperatures less than about 250° C., such as less than about 240° C., less than about 230° C., less than about 220° C., less than about 210° C., less than about 200° C., less than about 190° C., less than about 180° C., less than about 170° C., less than about 160° C., less than about 150° C., less than about 140° C., less than about 130° C., less than about 120° C., less than about 110° C., less than about 100° C., less than about 95° C., less than about 90° C., less than about 85° C., less than about 80° C., less than about 75° C. less than about 70° C., less than about 65° C., less than about 60° C., less than about 55° C., less than about 50° C., less than about 45° C., less than about 40° C., or less than about 35° C. In some embodiments, the gel may be heated during the first time period at between about 80° C. and about 120° C., such as between about 90° C. and about 110° C. In some cases, the temperature may be held substantially constant during the first time period, whereas in other cases the temperature may be varied.

The first volume of water may be removed from the gel during the first time period via evaporation (e.g., via distillation). In order to induce rapid microporous crystal nucleation, the first volume of water may be between about 15% and about 75% of the volume of water originally provided in the reaction mixture. For example, the first volume of water may be greater than about 15% of the water originally provided in the reaction mixture, such as greater than about 20%, greater than about 25%, greater than about 30%, greater than about 35%, greater than about 40%, greater than about 45%, greater than about 50%, greater than about 55%, greater than about 60%, greater than about 65%, or greater than about 70% of the water originally provided in the reaction mixture. The first volume of water may be less than about 75% of the water originally provided in the reaction mixture, such as less than about 70%, less than about 65%, less than about 60%, less than about 55%, less than about 50%, less than about 45%, less than about 40%, less than about 35%, less than about 30%, less than about 25%, or less than about 20% of the water originally provided in the reaction mixture.

After heating the gel for the first time period and removing the first volume of water, the gel may be heated for a second time period under hydrating (i.e., rehydrating) conditions. More specifically, during the second time period, a second volume of water may be added to the gel. It has been discovered that rehydrating the gel promotes crystallization of the microporous crystals. Surprisingly and unexpectedly, the rate of addition of the second volume of water to the gel during the second time period has a significant effect on the rate of crystallization of the microporous crystals. In some embodiments, the rate of addition of the second volume of water may be between about 0.5 and about 2.0 fold the rate of removal of the first volume of water. For example, the rate of addition of the second volume of water may be greater than about 0.5 fold the rate of removal of the first volume of water, such as greater than about 0.6 fold, greater than about 0.7 fold, greater than about 0.8 fold, greater than about 0.9 fold, greater than about 1.0 fold, greater than about 1.1 fold, greater than about 1.2 fold, greater than about 1.3 fold, greater than about 1.4 fold, greater than about 1.5 fold, greater than about 1.6 fold, greater than about 1.7 fold, greater than about 1.8 fold, or greater than about 1.9 fold the rate of removal of the first volume of water. The rate of addition of the second volume of water may be less than about 2.0 fold the rate of removal of the first volume of water, such as less than about 1.9 fold, less than about 1.8 fold, less than about 1.7 fold, less than about 1.6 fold, less than about 1.5 fold, less than about 1.4 fold, less than about 1.3 fold, less than about 1.2 fold, less than about 1.1 fold, less than about 1.0 fold, less than about 0.9 fold, less than about 0.8 fold, less than about 0.7 fold, or less than about 0.6 fold the rate of removal of the first volume of water.

During the second time period, the gel may be heated at a temperature ranging between ambient temperature and about 250° C. For example, the gel may be heated at temperatures greater than about 25° C., greater than about 30° C., such as greater than about 35° C., greater than about 40° C., greater than about 45° C., greater than about 50° C., greater than about 55° C., greater than about 60° C., greater than about 65° C., greater than about 70° C., greater than about 75° C., greater than about 80° C., greater than about 85° C., greater than about 90° C., greater than about 95° C., greater than about 100° C., greater than about 110° C., greater than about 120° C., greater than about 130° C., greater than about 140° C., greater than about 150° C., greater than about 160° C., greater than about 170° C., greater than about 180° C., greater than about 190° C., greater than about 200° C., greater than about 210° C., greater than about 220° C. or greater than about 230° C. The gel may be heated at temperatures less than about 250° C., such as less than about 240° C., less than about 230° C., less than about 220° C., less than about 210° C., less than about 200° C., less than about 190° C., less than about 180° C., less than about 170° C., less than about 160° C., less than about 150° C., less than about 140° C., less than about 130° C., less than about 120° C., less than about 110° C., less than about 100° C., less than about 95° C., less than about 90° C., less than about 85° C., less than about 80° C., less than about 75° C., less than about 70° C., less than about 65° C., less than about 60° C., less than about 55° C., less than about 50° C., less than about 45° C., less than about 40° C., or less than about 35° C. In some embodiments, the gel may be heated during the first time period at between about 80° C. and about 120° C., such as between about 90° C. and about 110° C. In some cases, the temperature may be held substantially constant during the second time period, whereas in other cases the temperature may be varied.

The second volume of water is between about 0.5 and about 2.0 fold the first volume of water. For example, the second volume of water may be greater than about 0.5 fold the first volume of water, such as greater than about 0.6 fold, greater than about 0.7 fold, greater than about 0.8 fold, greater than about 0.9 fold, greater than about 1.0 fold, greater than about 1.1 fold, greater than about 1.2 fold, greater than about 1.3 fold, greater than about 1.4 fold, greater than about 1.5 fold, greater than about 1.6 fold, greater than about 1.7 fold, greater than about 1.8 fold, or greater than about 1.9 fold the first volume of water. The second volume of water may be less than about 2.0 fold the first volume of water, such as less than about 1.9 fold, less than about 1.8 fold, less than about 1.7 fold, less than about 1.6 fold, less than about 1.5 fold, less than about 1.4 fold, less than about 1.3 fold, less than about 1.2 fold, less than about 1.1 fold, less than about 1.0 fold, less than about 0.9 fold, less than about 0.8 fold, less than about 0.7 fold, or less than about 0.6 fold the first volume of water.

In some embodiments, at least some of the first volume of water may be collected as a condensate, and the second volume of water may comprises at least some of the condensate.

After rehydrating the gel for the second period of time according to the methods described above, it has been discovered that microporous crystals will have grown at a rate substantially more rapidly than convention hydrothermal syntheses that do not utilize these dehydrating and rehydrating steps. In some embodiments, particularly for microporous crystals having a general propensity for slow crystallization (e.g., ZSM-5), the gel may be subjected to repeated rounds of dehydration and rehydration. Each round may be substantially as described above.

In some embodiments, either immediately prior to the first period of time, immediately after the first time period and prior to the second time period, or immediately after the second time period, the gel may be heated under non-dehydrating and non-rehydrating conditions for a desired period of time. In other words, the gel may be heated in a closed system that does not allow water to escape (e.g., under reflux).

Methods of Making Microporous Crystal Membranes

In some aspects, this disclosure provides methods of making microporous crystal membranes that include forming a reaction mixture comprising NaOH, water, and one or more of an aluminum source, a silicon source, whereupon the mixture forms a gel; heating the gel for a first time period, whereupon a first volume of water is removed from the gel and microporous crystal nuclei form, the nuclei having a framework: applying the gel to a solid support seeded with microporous crystals having a framework that is the same as the framework of the nuclei; and heating the gel for a second time period, during which a second volume of water is added to the gel, wherein the rate of addition of the second volume of water is between about 0.5 and about 2.0 fold the rate of removal of the first volume of water.

As will be appreciated, the initial steps of preparing a reaction mixture that forms a gel, and heating the gel for a first period of time are substantially the same as those described above for making microporous crystals. The dehydrated gel may then be applied to a solid support that has been seeded with microporous crystals having a framework that is substantially the same as the framework of the nuclei in the gel. The solid supports may be made of a wide variety of materials having varying structures depending on the desired application of the microporous membrane. For example, the solid support may be metallic (e.g., stainless steel, aluminum, titanium, copper, tin, gold, silver, palladium, oxides of these metals, or any other suitable metal or metal oxide), polymeric (e.g., synthetic polymers, such as polyvinylchloride, polyethersulfone, polyethylene, polypropylene, polydimethylsiloxane, and polybenzoxazole, or natural polymers, such as cellulose, starch, lignin, or any other suitable synthetic or natural polymer), ceramic, or any other suitable solid material. In some embodiments, the solid support may be porous, having pore sizes ranging from about 0.05 to about 2.0 microns. The solid support may be seeded with microporous crystals according to methods well known in the art.

After the gel has been applied to the solid support, the gel may be heated for a second time period, during which a second volume of water is added to the gel. This step may be substantially the same as the step described above with respect to the method for forming zeolite crystals.

Additional elements of the methods described herein will be understood and appreciated as set forth in the examples below.

EXAMPLES

Materials and General Methods

All materials for synthesis of microporous crystals described below were purchased from Sigma-Aldrich and used as received. The following chemicals were used: aluminum hydroxide (Alfa Aesar 76.5% min. assay), LUDOX SM-30 colloidal silica (Aldrich), tetramethylammonium bromide (TMABr, Aldrich 98%), tetramethylammonium hydroxide (TMAOH, SACHEM Inc. 25% aqueous), and sodium hydroxide pellets (Fisher 99.0%). Deionized water (18MΩ) was used in all cases. Biomax polyethersulfone (PES) ultrafiltration disks obtained from Millipore (PBMK15005, 300 kDa NMWL) were used as supports.

Diffraction patterns were collected using a Bruker D8 Advance with Ni filtered Cu Kα radiation using a 1 s dwell time and 0.02° step size. The fitted line profiles were used to calculate the relative crystallinity curves using the integrated areas of the first four FAU Bragg reflections. Due to a complex background below 10° 2θ a linear background subtraction was performed prior to fitting.

High resolution scanning electron micrographs were collected using a Phillips XL-30F ESEM or a Sirion FEG SEM both are equipped with high resolution field emission guns. Measurements were made on washed, gold coated samples. Transmission electron micrographs were collected using a Tecnai F20 field emission 200 kV S/TEM system.

Raman spectra of powders were collected from a Renishaw invia Raman microspectrometer equipped with a CCD. A He—Ne laser was used for 633 nm excitation. Spectra were collected with optical configurations yielding ~4 $cm^{-1}$ resolution. Laser powers at the sample were 1 mW. All spectra were collected from solid samples under continuous translation on a custom sample spinning stage to avoid laser damage or heating. Samples were enclosed in a custom built sealable stainless steel sample container equipped with a quartz window.

A Bruker DSX 300 MHz superconducting magnet equipped with a dual channel (H-X) MAS probe was used to collect high resolution $^{29}$Si (59.6 MHz), $^{27}$Al (78.2 MHz) and $^{23}$Na (79.4 MHz) spectra. Approximately 100 mg of sample was packed into a 4 mm zirconium rotor with a Kel-F cap. The $^{29}$Si{$^{1}$H} NMR spectra were acquired using a standard CPMAS pulse program with acquisition parameters as follows: spinning rate of 5 kHz, CP contact time of 5 ms, 10 s recycle delay, 6 k-16 k scans per sample, and line broadening of 20 Hz. The 27Al NMR spectra were collected using Bloch decay with acquisition parameters as follows: a 4 μs 90° pulse, spinning rate of 5 kHz, 0.5 s recycle delay, 128-1024 scans per samples, and line broadening of 20 Hz. The $^{23}$Na NMR spectra were collected using a standard DP-MAS pulse sequence with acquisition parameters as follows: 1 s relaxation delay, 1024 scans per sample, and line broadening of 10 Hz.

Nitrogen adsorption measurements were made using a Quantachrome NOVA 2200e. Adsorption isotherms were analyzed using Brunauer, Emmett, and Teller (BET) theory. The external surface area, the presence of micropores, and the micropore volume was estimated using the t-plot method using De Boer's thickness equation for an oxidic surface.

Example 1

Methods of Making Microporous Crystals

Synthesis of Zeolite Crystals

FAU type zeolite was synthesized from an opaque gel with the following composition: $17Na_2O:1Al_2O_3:12.80SiO_2:975H_2O$. The gel was prepared by combining a basic clear solution of NaOH, $Al(OH)_3$ and $H_2O$ with colloidal silica Ludox SM-30 while stirring in a polypropylene bottle. The resulting gel was aged while stirring for 4 hrs at room temperature. There were seven synthesis protocols that were developed, five of them using this aged gel. Synthesis I involved reaction in Teflon lined stainless steel Parr digestion vessels (bombs), placed within an oven at 100° C. under static conditions. To measure the progress of synthesis, bombs were removed periodically, and analyzed as detailed below. In Synthesis II, the aged gel was transferred to a round bottom flask (PTFE, glass) connected to a graduated pressure equalizing addition funnel with a PTFE stopcock topped with a condenser. For Synthesis II, only the reflux part of the apparatus was used (temperature of reflux was 100-103° C.). For Synthesis III, while under reflux, 40 mL of $H_2O$ from the reaction was removed by condensation in the addition funnel (about half the volume of water in the flask) over a period of one hour, and the reflux continued. For Synthesis IV, the collected water was then re-added back dropwise to the concentrated gel over a period of another hour, after which the gel was allowed to react under reflux without any further change. Synthesis V used the same apparatus, but the gel composition was twice as concentrated to be $17Na_2O:1Al_2O_3:12.80SiO_2:564H_2O$ (also aged for 4 hour), and done under reflux. Synthesis VI used the same composition as Synthesis V and aging conditions, but 40 ml water was added back dropwise (50 min)

after one hour of reflux to achieve the final composition of 17Na$_2$O:1Al$_2$O$_3$:12.80SiO$_2$:975H$_2$O, and the reaction was continued under reflux. Microwave Synthesis VII was performed with a Discovery microwave oven (CEM) with 300 W output at 2.45 GHz while mechanically stirring for a designated amount of time. Samples were removed at various times during the synthesis process for all of the protocols. Once removed, samples were immediately cooled in an ice bath for 1 hr followed by 30 min of centrifugation at 2500 rpm. The pellets were lyophilized and stored under vacuum (50 mTorr) until analyzed.

Characterization of Zeolite Crystals

Figure 1:
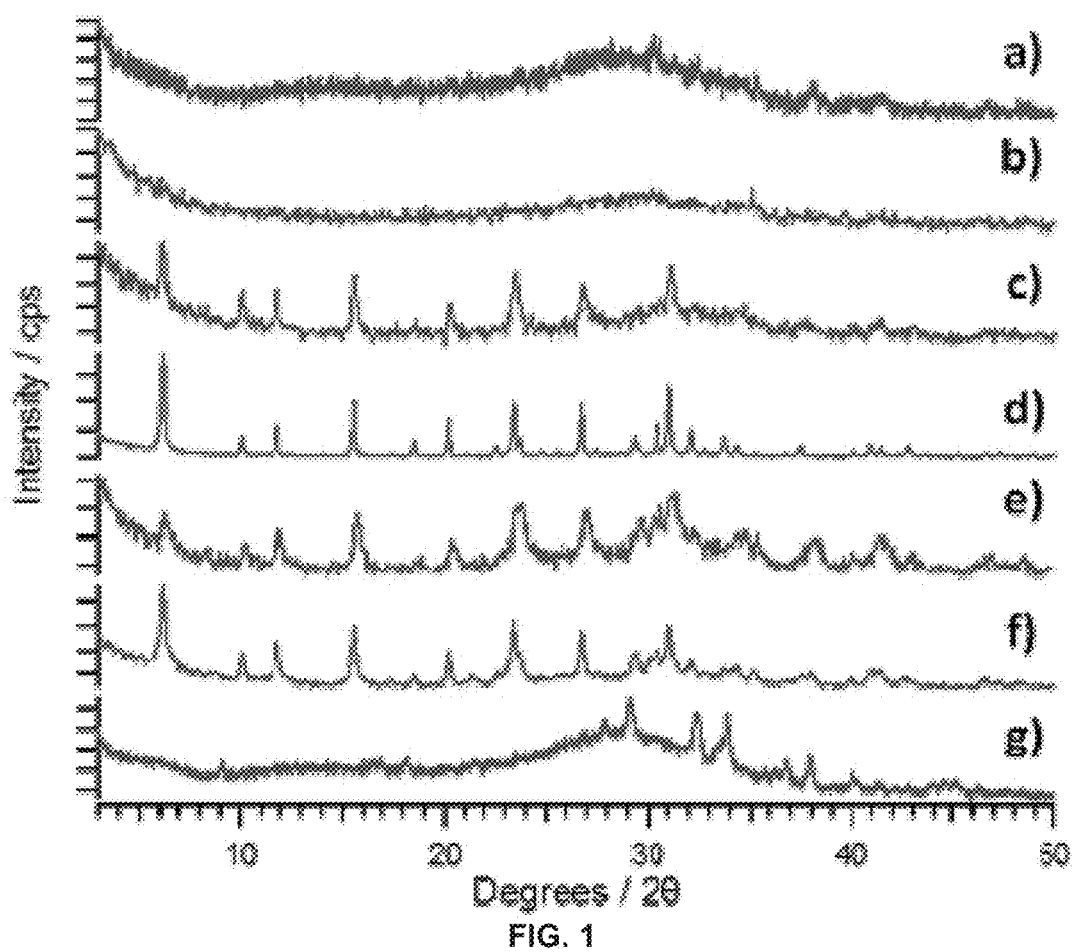
FIG. 1 is a series of X-ray diffraction (XRD) patterns for samples collected from gels after 2 hours of being submitted to various synthesis protocols.

Five different protocols of zeolite synthesis were carried out with the composition 17 Na$_2$O: Al$_2$O$_3$: 12.8 SiO$_2$:975 H$_2$O, which was aged for 4 hours at room temperature. FIG. 1 shows the X-ray diffraction (XRD) patterns for the powder product isolated from each experiment after two hours. Synthesis I involved a conventional hydrothermal synthesis and was carried out in Teflon lined autoclaves at 100° C. FIG. 1a shows the XRD pattern after two hours of heating and no FAU crystals are apparent. Synthesis II was carried out with the same aged composition but under reflux conditions in a round bottomed flask with stirring. FIG. 1b shows that no FAU crystals are observed in the diffraction pattern. Synthesis III was performed in a similar fashion to Synthesis II, but during reflux, about half of the water (40 ml) from the reaction mixture was removed as condensation over a period of an hour, and the reflux continued with the composition 17Na$_2$O:1Al$_2$O$_3$:12.80SiO$_2$:564 H$_2$O. FIG. 1c shows the diffraction pattern after two hours using Synthesis III, the broad reflection peaks characteristic of FAU are observed, but with continued reflux, there is no sharpening of the peaks up to a period of 6 hours. In synthesis IV, the water that was collected over one hour was gradually dripped back into the refluxing reaction mixture over the period of 50 minutes, and then the reaction was allowed to proceed under reflux conditions for 10 more minutes. FIG. 1d shows the diffraction pattern (total of ~two hours, just as in Synthesis II and III), indicative of well-formed FAU crystals. Water addition at a rate of 0.5-1 ml/min was essential to the rapid crystal growth in Synthesis IV, if the water is added back fast (within minutes), the crystallization is incomplete. If the water addition is slower (40 ml in 120 min), results are similar to Synthesis III. The next two synthesis protocols were carried out with the composition that was about twice as concentrated 17 Na$_2$O:1Al$_2$O$_3$:12.80SiO$_2$:564 H$_2$O (essentially the composition that is in the reactor after the water is removed in Synthesis III and IV). The gel was aged for 4 hours and the reaction carried out under reflux, and designated as Synthesis V. FIG. 1e shows the powder pattern indicating that some crystallization has taken place, but the diffraction peaks do not sharpen with time. For Synthesis VI, the same composition as Synthesis V was used, but after one hour of reflux, 40 ml of water was dripped back into the flask over 50 minutes. FIG. 1f shows the powder diffraction pattern after 2 hrs (10 min beyond the time after water addition), and shows that the crystallization is accelerated as compared to Synthesis V, but with further heating, the diffraction peaks remained broad. FIG. 1g shows the product recovered after 2 hours of microwave growth (Synthesis VII) using the conditions of Synthesis I, no crystallization was observed. A comparison of the crystallization behavior of Synthesis IV with the results of all the other synthesis protocols supports that the water cycling method is leading to fastest crystallization kinetics.

Comparison of Synthesis IV with Conventional Hydrothermal Synthesis

Several experiments were conducted focusing on Synthesis IV, in the 60-110 min time frame, with 60 min being the time at which the water is being added back (after 1 hour of reflux) and 110 min being the time at which the water addition is essentially complete. FIG. 2a shows the diffraction patterns of the solids recovered from the gel at 60 min, 70 min, 80 min, 90 min, 100 min and 110 min into Synthesis IV. A diffraction pattern consistent with FAU type zeolite is first observed at 80 min (i.e. 20 min after beginning the dropwise rehydration of the concentrated gel). This pattern continues to develop with time as the gel is rehydrated, and the peaks increase in intensity, until reaching completion at 110 min. The evolution of the surface area of the material after rehydration is shown in FIG. 2b and follows a similar trend as the XRD. The surface area begins to increase rapidly 20 min after beginning to rehydrate the gel, is almost complete one hour after beginning to rehydrate the gel (600 m$^2$/g) and finally saturates at a value of ~660 m$^2$/g.

FIG. 2c shows the XRD patterns for samples collected at 1 hour. 2 hours, 3 hours, 4 hours, 5 hours and 6 hours into Synthesis I (the conventional hydrothermal reaction). Zeolite begins to crystallize after 4 hrs., at which point the first signs of the Bragg reflections characteristic of the zeolite Y appear in the diffraction pattern. As the reaction proceeds, these reflections grow linearly in intensity until crystallization is complete around 7 hrs (all data presented is with samples heated for 8 hours).

Figure 3:
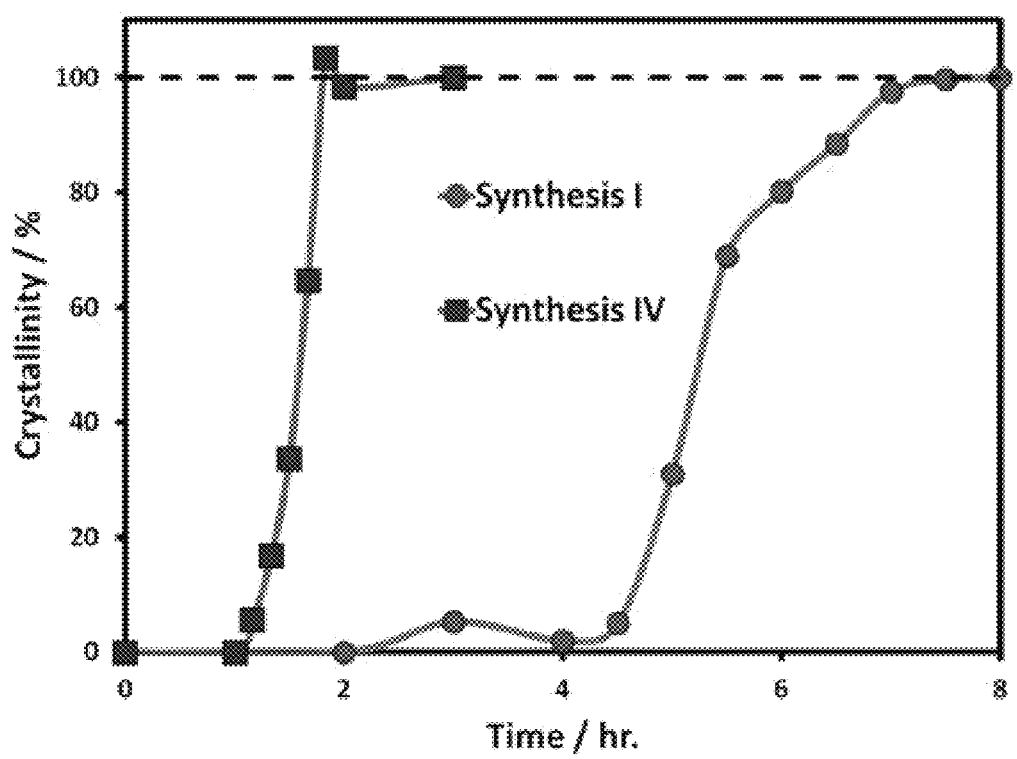
FIG. 3 is a graph showing crystallization for identical aluminosilicate gels submitted to both a dehydration-rehydration synthesis protocol and a standard hydrothermal synthesis protocol.

The effect of water cycling (i.e., the process of controlled dehydration and rehydration) on the reaction kinetics of zeolite crystallization is illustrated by the comparison of the crystallization curves (i.e., % crystallization as a function of time) shown in FIG. 3. FIG. 3 is a graph showing the crystallization curves for identical aluminosilicate gels submitted to Synthesis I (the conventional hydrothermal reaction) and Synthesis IV. The dehydration-rehydration process of Synthesis IV dramatically decreases the crystallization times for the same aluminosilicate gel.

Figure 4:
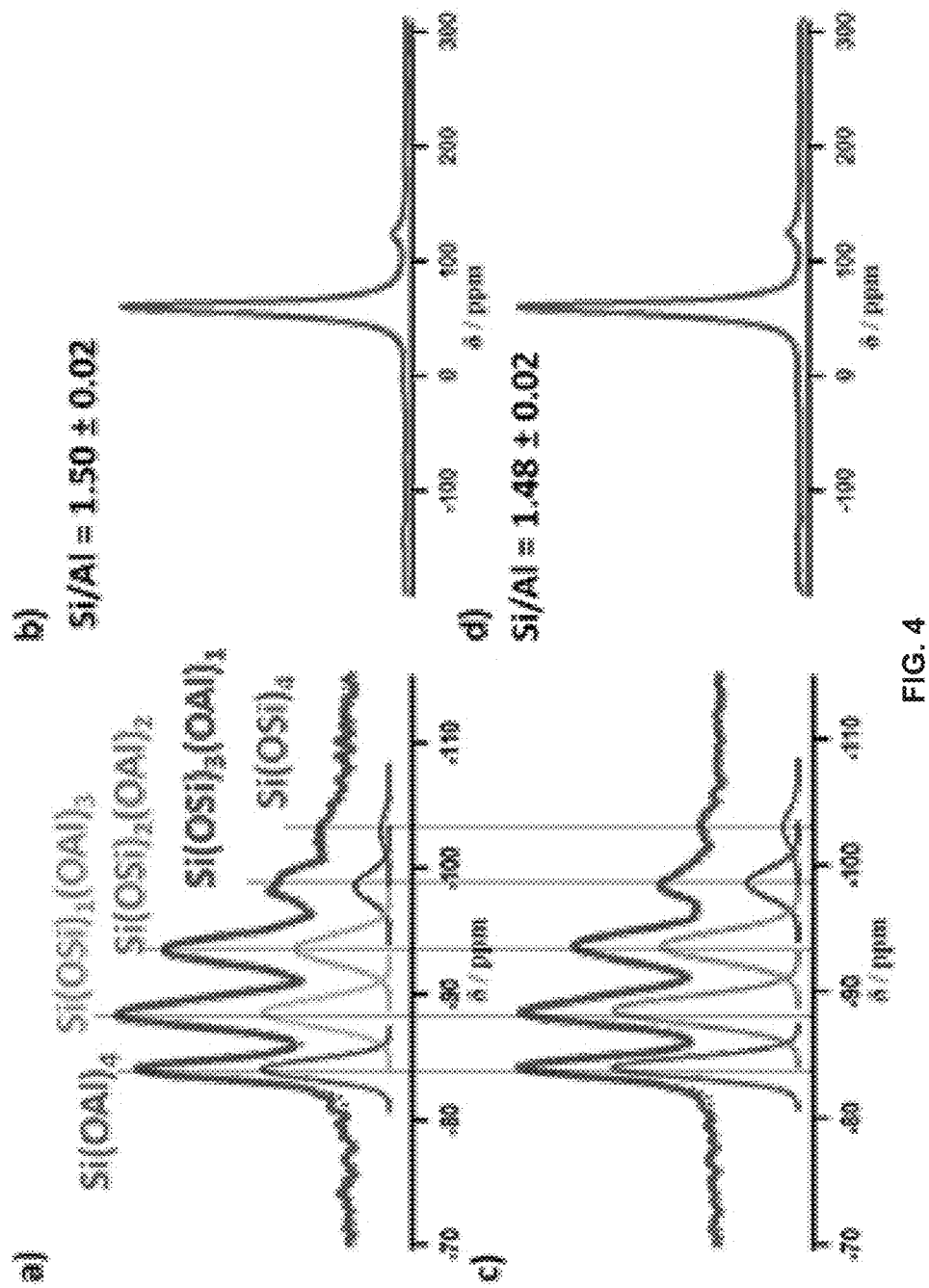
FIG. 4 shows (a) $^{29}Si\{^1H\}$ NMR spectra of the crystalline product of a dehydration-rehydration synthesis protocol, (b)

FIG. 4 shows (a) $^{29}$Si{$^1$H}NMR spectra of the crystalline product of Synthesis IV, (b) $^{27}$Al MAS NMR spectra of the crystalline product of Synthesis IV, (c) $^{29}$Si{$^1$H}NMR spectra of the crystalline product of Synthesis I, (d) $^{27}$Al MAS NMR spectra of the crystalline product of Synthesis I. A quantitative analysis of the peak intensities was used to calculate the Si/Al ratio according to a method described in Lippman, et al., *J. Am. Chem. Soc.* 1981, 103, 4992-4996. The Si/Al ratio of the zeolite obtained with Synthesis I and IV was calculated to be approximately 1.48 (±0.02) and 1.5 (±0.02), respectively, which is within the experimental error of measurement. The aluminum NMR spectra indicate a single resonance at 60 ppm characteristic of tetrahedral aluminum. AlO$_4$.

Analysis of Intermediate Stages of Crystallization During Synthesis IV

FIG. 5 is a series of SEM images of samples collected from a gel being submitted to Synthesis IV at (a) 0 min (b) 60 min (c) 70 min (d) 80 min (e) 90 min (f) 100 min (g) 110 min, and (h) 120 min. As the 0 min gel (FIG. 5a) converts to the 60 min gel (FIG. 5b) with dehydration of the gel, the major change is the creation of smaller gel particles, which is also reflected in the ~10 fold increase in surface area of the 60 min gel (from 4 to 45 m$^2$/g). FIGS. 5c-h follow the gel as it is rehydrated, with data observed every 10 min. Sharp edges develop in the SEM at approximately 80 min (FIG. 5d), supporting the conclusion that crystals are being formed. This trend continues with time, and finally at 120 min (FIG. 5h), multifaceted and agglomerated crystals are observed. Evolving from the 80 min (FIG. 5d) to the completely crystalline sample at 120 min (FIG. 5h), the amorphous gel (small particles <100 nm) surrounding the crystals are incorporated into the growing crystals.

FIG. 6 shows (a) a High-Res TEM image of a sample collected from a gel being submitted to Synthesis IV at 60 min after completing dehydration of the gel, (b) a Dark-Field TEM image of the same gel after 70 min, and (c) a High-Res TEM image of the same gel at 70 min. The dehydrated gel appears, in FIG. 6a, to be porous with curved interfaces. After 10 min if water addition, the bright regions at the edges assigned to crystalline domains, as shown in FIG. 6b. Higher resolution images of some of the edges (FIG. 6c) indicates the presence of fringes indicative of crystal formation. It is at the interfaces of the porous microstructure formed with dehydration that the subsequent crystallite formation is initiated upon re-hydration.

FIG. 7a shows Raman spectra of samples collected from a gel being submitted to Synthesis IV after (I) 0 min, (II) 60 min, (III) 70 min, (IV) 80 min, (V) 90 min, and (VI) 120 min. The primary focus was in the prominent T-O-T bending region (300-700 $cm^{-1}$). The Raman spectrum of the 0 min sample (i.e., the aged gel prior to heat treatment and dehydration) contains two primary features at 499 and 605 $cm^{-1}$. The Raman spectrum of the 60 min sample (i.e., immediately after dehydration) contains two peaks at 465 and 568 $cm^{-1}$ while the peaks previously observed at 499 and 605 $cm^{-1}$ are no longer observed. If the 60 min sample is washed, the Raman spectrum of the washed sample looks appears the same as the 0 min sample. At 70 min (after partial rehydration), the Raman spectrum begins to show the appearance of the FAU band at 505 $cm^{-1}$, and with time, this band grows in intensity, while the peak at 465 $cm^{-1}$ gradually disappears.

FIG. 7b shows $^{23}$Na MAS NMR of samples from the same gel collected at (I) 0 min, (II) 60 min, and (III) 120 min. $^{23}$Na MAS NMR was used to follow the evolution of the local environment of extra framework sodium during the Synthesis IV reaction. The NMR spectra in each contain one broad band representing sodium in the aluminosilicate environment with the second sharp peak at 7 ppm being assigned to residual NaOH. The NaOH can be removed upon washing. Though the bands are broad due to quadrupolar effects (I=3/2), there is a noticeable shift in the peak position with reaction time. The broad peak around −8.7 ppm at time zero is observed before the onset of crystallization. After 60 min reaction and dehydration, while the material is still X-ray amorphous, a broad band is observed at about −16.5 ppm. Crystalline zeolite isolated after 120 min reaction is characterized by a sharper band at −1.8 ppm.

Accelerating Zeolite Crystal Formation

Figure 2:
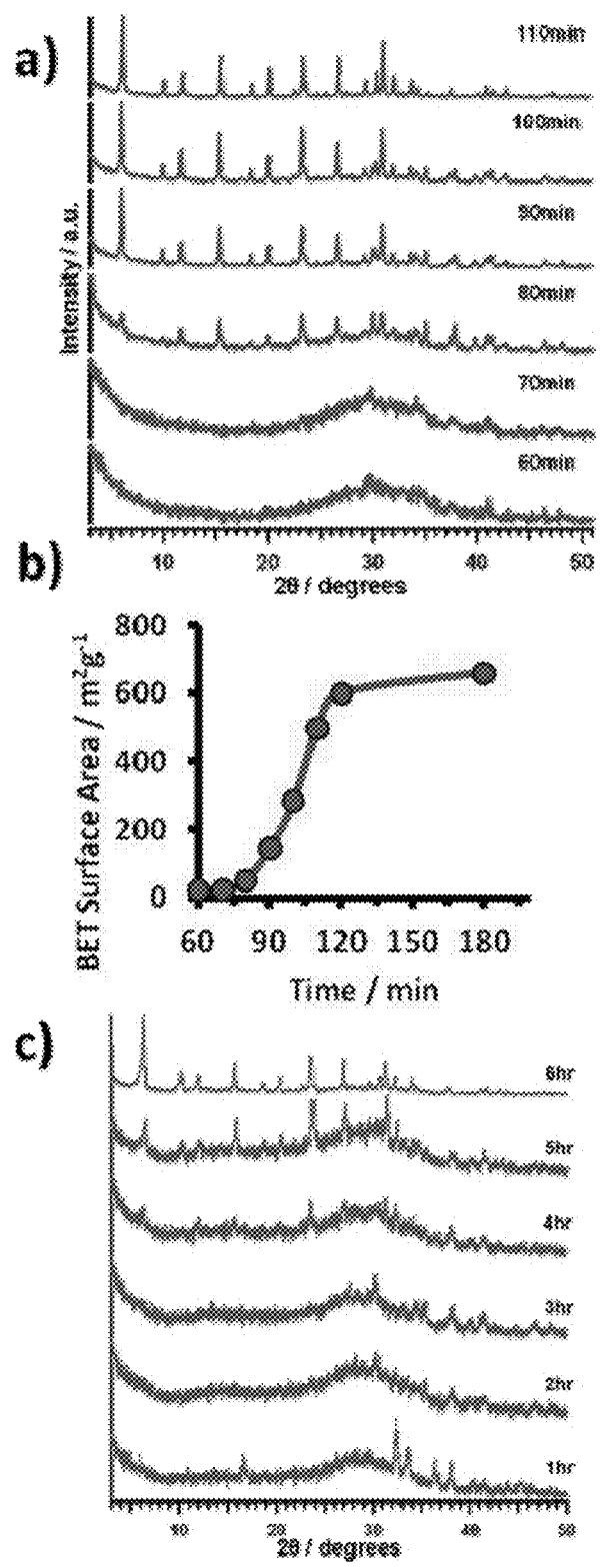
FIG. 2 (a) is a series of XRD patterns for samples collected at various times from a gel being submitted to a dehydration-rehydration synthesis protocol, (b) is a graph of the BET surface area (as estimated from nitrogen adsorption measurements) as a function of time for the same gel being submitted to the same dehydration-rehydration synthesis protocol, and (c) is a series of XRD patterns for samples collected at various times from an identical aluminosilicate gel synthesized under a standard hydrothermal synthesis protocol.

It is clear from FIGS. 1 and 2 that the dehydration-rehydration strategy in Synthesis IV leads to substantially more rapid crystallization of zeolite relative to convention hydrothermal crystallization. The HR-TEM in FIG. 6a shows that removal of the water during the first 60 min leads to an aluminosilicate gel with a highly porous network. SEM of this material (FIG. 5) suggests that with dehydration, there is restructuring of the gel into ~100 nm particles. It is hypothesized that these changes are being driven by the increasing hydroxide ion concentration, which leads to dissolution of the initial gel and restructuring to porous structures made up of nanometer particles. Within 10-20 min of re-addition of water, SEM, TEM, XRD and Raman all indicate the formation of zeolite crystals. The rapidity with which the 60 min gel (immediately after water removal) transforms to crystals suggests that it is heavily nucleated. This extensive nucleation is being promoted by high degree of local supersaturation and the porous structure which exposes the gel-liquid interface with facilitation of transport of nutrient species. Correlation between increasing supersaturation and nucleation rate is well established in the literature. Porous structure and liquid filled vacuoles have been reported within the gel particle for zeolite A growth, and nuclei were proposed to nucleate at the gel-vacuole liquid interface. See Valtchev, et al., *J. Am. Chem. Soc.* 2005, 127, 16171-16177. The final intergrown zeolite morphology (FIG. 5h) also suggests that the gel structure is heavily nucleated.

It was possible to get a spectroscopic signature of the nucleated state by examining the 60 min sample (after water removal). The Raman spectrum of this material shows bands at 465 and 570 $cm^{-1}$ (FIG. 7). There have been numerous Raman spectroscopic studies of zeolite growth, and in these studies the spectrum of the initial gel resembles what we observe for the 0 min gel (500, 605 $cm^{-1}$ due to the gel and oligomeric silicate species, respectively), and then these bands evolve to the sharper Raman bands typical of the crystal. Raman spectroscopy provides the vibrational fingerprint of the entire gel, and if there are few pockets of nuclei formation, as in a typical hydrothermal synthesis, it will not be possible to distinguish these from the rest of the aluminosilicate gel. For this reason, it has been difficult to get spectroscopic information of nuclei. If the 60 min sample is washed, the Raman spectrum reverts back to the aged gel, indicating that the material represented by the 465, 570 $cm^{-1}$ bands are metastable structures, and only exist under the basic supersaturated conditions. So, the species represented in FIG. 7 is representative of the nucleated state of the zeolite. The band at 465 $cm^{-1}$ is assigned to four-membered aluminosilicate rings, and the band around 570 $cm^{-1}$ is assigned to branched structures. Since we observe the loss of these bands and the growth of zeolite bands (within 10 min), we cannot identify the intermediate structures between the heavily nucleated state and the crystal.

The NMR spectra in FIG. 7b also provide structural information of the nucleated state. A previous study of a faujasite synthesis using MQMAS $^{23}$Na NMR noted two primary peaks at −1 and −9 ppm corresponding to crystalline and amorphous environments respectively. See Valtchev, et al., *Micropor. Mesopor. Mat.* 2007, 101, 73-82. A broad band at −9 ppm was attributed to sodium in the amorphous gel environment. This band sharpened with reaction time but its intensity decreased proportionally with the growing intensity of a band at −1 ppm assigned to sodium within the crystalline zeolite environment. Similar assignments are made to explain the data in FIG. 7b, as we also observe a band at −8.7 ppm giving way to a band at −1.8 ppm upon crystallization. However, no intermediate state was observed in the previous study (See id.), yet we observe an intermediate state with a band position of −16.5 ppm for the 60 min dehydrated sample. The appearance of the band at −16.5 ppm coincides with the appearance of a pair of transient peaks at 465 and 570 $cm^{-1}$ in the Raman spectrum. Therefore, the intermediate peak at −16.5 ppm is tentatively assigned to sodium ions coordinated to 4MR aluminosilicate environments. The process of nucleation has been proposed to involve penetration of $Na^+$ into the amorphous gel structure and reorganization of the aluminosilicate species. Our observation of a unique $Na^+$ environment for the heavily nucleated state is consistent with this hypothesis.

It is believed that the added water facilitates dissolution and transport of nutrients from the amorphous material to the growing crystal. It also is believed that too rapid a dilution destroys the metastable nuclei by altering the supersaturation. FIG. 8 shows a schematic of the process. Panel 1 represents the attainment of a pseudo-equilibrium at the gel-solution interface. Panel 2 demonstrates the microstructural development of the amorphous gel during dehydration. Chemical transformations at the interface lead to dense nucleation. In panel 3, the dense nuclei produced at the gel interface begin to crystallize upon re-hydration. Continued re-hydration leads to complete crystallization of the nuclei that fuse during growth to yield the complex crystal morphology observed in FIG. 5h.

The rapid effect of crystal growth that we observe cannot be obtained by microwave heating (FIG. 1g). The importance of this work is creating the conditions for extensive nucleation, and water mediated crystal growth, as a result of which a zeolite product of high quality can be obtained in a fraction of the time of traditional hydrothermal synthetic techniques.

Synthesis of Zeolites with Higher Si/Al Ratios

FAU type zeolite Y was synthesized using substantially the same processes as are described for Syntheses I and IV above. The protocols only differed in that the gel composition comprised $17Na_2O:1Al_2O_3:12.80SiO_2:975H_2O$, and for Synthesis IV, rehydration was performed by adding 40 mL of a 10 mM aqueous TMAOH solution instead of water.

The zeolites synthesized form the gel composition comprising a gel composition comprising $17Na_2O:1Al_2O_3:12.80SiO_2:975H_2O$ using Syntheses I and IV were analyzed to determine whether zeolites having higher Si/Al ratios can be synthesized more quickly with the dehydration-rehydration protocol described herein. FIGS. 9 and 10 show XRD patterns for samples collected at various times from the gel while being submitted to Synthesis I (FIG. 9) and Synthesis IV (FIG. 10). It is clear from these patterns that, even for crystals having significantly higher Si/Al ratios, the dehydration-rehydration protocol of Synthesis IV leads to substantially faster zeolite crystallization than the standard hydrothermal protocol of Synthesis I. This is shown even more clearly in FIG. 11, which shows that Synthesis IV leads to substantially complete crystallization after 5 hours, whereas Synthesis I requires more than twice the reaction times to achieve the same degree of crystallization.

Synthesis of ZSM-5 Zeolites

ZSM-5 zeolites were synthesized using substantially the same process as are described for Syntheses I and IV above, with a few slight modifications. First, the gel composition for both the Synthesis I and IV protocols comprised $45.7Na_2O: Al_2O_3: 85SiO_2: 8.6TPABr: 17H_2SO_4: 2571H_2O$, where TPABr is tetrapropylammonium bromide.

Second, for the Synthesis I protocol, the gel was refluxed without any removal of water for several days. Samples were collected after 24 hours, 48 hours, 72 hours, and 96 hours. As demonstrated by the XRD patterns shown in FIG. 12, the first evidence of ZSM-5 zeolite crystals from Synthesis I was observed after 3 days of heating without dehydration (characteristic peaks of ZSM-5 marked with asterisks).

Third, for the Synthesis IV protocol, the process was modified as shown in FIG. 13. Specifically, the gel was refluxed for 2 hours without any water removal and then over a period of 15 min, 13 mL water was removed from the reaction system. The gel was then refluxed for 30 min in this concentrated state, and the collected water was then added back to the gel over a time period of 15 min. The gel was then refluxed for 30 min without any water removal, and then 13 mL water was removed again and the dehydration-rehydration process was repeated twice. The gel was then refluxed overnight without any water removal. The dehydration-rehydration process was then repeated five more times over the course of the next day, and samples were collected after 30 hours, 32 hours, 36 hours and 48 hours. As demonstrated by the XRD patterns shown in FIG. 14, the first evidence of ZSM-5 crystals from the modified dehydration-rehydration protocol of Synthesis IV was observed after 36 h (characteristic peaks of ZSM-5 marked with asterisks). The modified dehydration-rehydration protocol shown in FIG. 13 sped up the crystallization process by approximately 2-fold relative to the standard hydrothermal process, as shown in FIG. 15.

Example 2

Methods of Making Microporous Crystal Membranes

Synthesis of Zeolite Membranes

Nanozeolite seed crystals were synthesized as described by Holmberg, et al., *Micropor. Mesopor. Mat.* 2003, 59, 13-28. Membranes were grown on porous, seeded PES supports. PES was supported on a non-woven polyester backing and was found to have a surface porosity of 15% and an average pore size of ~60 nm. The supports were seeded with a 0.1 wt % aqueous dispersion of nanozeolite Y crystals ($D_{avg}$=47 nm) by vacuum assisted dip coating.

Hydrothermally grown membranes were prepared by submerging the as-synthesized PES supported seed layers in a zeolite growth solution identical in composition to Synthesis I, described above. The shape and orientation of the flexible PES supported seed layers was fixed in a custom PTFE sample holder. The support assembly was submerged with an almost vertical orientation with the seeded surface slight facing down within a Teflon lined stainless steel autoclave. The reaction was heated in an oven at 100° C. for 8 hrs under static conditions, after which the support assembly was washed liberally with distilled water.

Rapidly grown membranes were prepared in a similar fashion but by first coating a viscous aluminosilicate gel layer, with a composition close to $17Na_2O:1Al_2O_3:12.80SiO_2:564H_2O$, across the seeded surface with a Teflon knife. The amorphous aluminosilicate gel used in coating was isolated from Synthesis IV (described above) after 60 min of dehydration. The gel coated seed layer was subsequently submerged within the concentrated Synthesis IV mother gel that had reacted for 60 min (from which the amorphous coating was derived). The reaction proceeded for 50 min with dropwise re-hydration under reflux conditions, as typical of Synthesis IV, after which the support assembly was removed and washed liberally with distilled water.

Characterization of Zeolite Membranes

The 60 min gel was recovered, applied via knife casting on a 40 nm zeolite seeded porous polymer support (polyethersulfone), and introduced back into the reflux chamber at the 60 min mark (after the water was removed), and the dropwise rehydration process was carried out under reflux conditions for 50 min, and the reflux process carried out for 10 more minutes. The membrane was then recovered, washed and structural studies were carried out.

FIG. 16 is a series of SEM images showing (a) a top view of the PES support surface, (b) the support surface after it has been seeded with zeolite crystals, (c) surface of a seeded PES support grown after having had the 60 min gel applied and then rehydrated for 1 hr, and (d) its respective cross-sectional view. FIG. 16d shows that the seeded system has transformed into interconnected zeolite crystals. The cross-section shows a dense membrane layer ~500-700 nm thick.

FIG. 17a shows a magnified SEM image of the cross-section from FIG. 16d, where there is a clear interface between the PES support and the zeolite layer. This view of the interface also shows the presence of a material within the PES pore structure, penetrating to a depth of ~1 µm. FIG. 17b shows the STEM of the same cross section FIGS. 17c and 17d, respectively, show the silicon and aluminum elemental maps of the same cross section, indicating that the layer is aluminosilicate, and indicating that the zeolite is also crystallizing within the pores of the polymer support surface. FIG. 17e shows the XRD of the membrane, with the peak at 6° (2θ) arising from the zeolite.

A 40 nm seeded polymer support also was treated under hydrothermal conditions (Synthesis I), and took 8 hours for formation of the membrane. The top view and cross section, along with the XRD is shown in FIG. 18. The data is similar to that of FIG. 17, with a membrane thickness of 2000 nm, but the zeolite membrane took substantially longer to grow than the membrane submitted to the dehydration-rehydration protocol described above.

Accelerating Zeolite Membrane Formation

The extensively nucleated gel formed during the dehydration step was isolated and used as the starting material for synthesis of zeolite membranes, with the goal of decreasing the long synthesis times typical for zeolite membranes. With the conventional Synthesis I method, it took 8 hours to form the membrane (FIG. 18). However, using the 60 min extensively nucleated gel as the starting reactant led to membrane formation within an hour. Another aspect of using the nucleated gel is that it is fluid enough to penetrate into the pores during the knife casting. Thus, a dense top zeolite layer and an interpenetrated layer within the polymer support, as seen in FIGS. 16 and 17, results from this procedure. Interpenetration by the zeolite membrane into the support during growth provides stability by anchoring the membrane to the support despite their electrostatic differences.

REFERENCES

The following references are hereby incorporated by reference in their entireties:
(1) Breck, D. Molecular Sieves. John Wiley & Sons 1974.
(2) Auerbach, S. M.; Carrado, K. A.; Dutta. P. K. Handbook of Zeolite Science and Technology. CRC Press 2003.
(3) Vladislav, A. B.; Ilyushin, G. D.; Proserpio, D. M. The Zeolite Conundrum: Why Are There so Many Hypothetical Zeolites and so Few Observed? A Possible Answer from the Zeolite-Type Frameworks Perceived As Packings of Tiles. Chem. Mater. 2013, 25, 412-424.
(4) Cundy, C. S.; Cox, P. A. The Hydrothermal Synthesis of Zeolites: History and Development from the Earliest Days to the Present Time. Chem. Rev. 2003, 103, 663-702.
(5) Valtchev, V.; Mintova, S.; Dimov, V.; Toneva, A.; Radev, D. Tribochemical Activation of Seeds for Rapid Crystallization of Zeolite Y. Zeolites. 1995, 15, 193-197.
(6) Cundy, C. S.; Plaisted. R. J.: Zhao, J. P.; Remarkable Synergy Between Microwave Heating and the Addition of Seed Crystals in Zeolite Synthesis—A Suggestion Verified. Chem. Commun. 1998, 14, 1465-1466.
(7) Li, Q.; Creaser, D.; Sterte, J. An Investigation of the Nucleation/Crystallization Kinetics of Nanosized Colloidal Faujasite Zeolites. Chem. Mater. 2002, 14, 1319-1324.
(8) Arafat, A.; Janser, J. C.; Ebaid, A. R.; van Bekkum, H. Microwave Preparation of Zeolite Y and ZSM-5. Zeolites. 1993, 12, 162-165.
(9) Pera-Titus, M. Porous Inorganic Membranes for $CO_2$ Capture: Present and Prospects. Chem. Rev. 2014, 114, 1413-1492.
(10) White, J. C.; Dutta, P. K.; Shqau, K.; Verweij, H. Synthesis of Ultrathin Zeolite Y Membranes and their Application for Separation of Carbon Dioxide and Nitrogen Gases. Langmuir. 2010, 26, 10287-10293.
(11) Krishna, R.; van Baten, J. M. J. In Silico Screening of Zeolite Membranes for $CO_2$ Capture. J. Membr. Sci. 2010, 360, 323-333.
(12) Bastani, D.; Esmaeili, N.; Asadollahi, M. Polymeric Mixed Matrix Membranes Containing Zeolites as a Filler for Gas Separation Applications: A Review. J. Ind. Eng. Chem. 2013, 19, 375-393.
(13) Mintova, S.; Olson, N. H.; Bein, T. Electron Microscopy Reveals the Nucleation Mechanism of Zeolite Y from Precursor Colloids. Angew. Chem. Int. Ed. 1999, 38, 3201-3204.
(14) Anderson, M. W.; Agger, J. R.; Thomton, J. T.; Forsyth, N. Crystal Growth in Zeolite Y Revealed by Atomic Force Microscopy. Angew. Chem. 1996, 35, 1210-1213.
(15) Nikolakis, V.; Vlacho, D. G.; Tsapatsis, M. Modeling of Zeolite Crystallization: the Role of Gel Microstructure. Micropor. Mesopor. Mat. 1998, 21, 337-346.
(16) Twu, J.; Dutta, P. K.; Kresge, C. T. Raman Spectroscopic Studies of the Synthesis of Faujasitic Zeolites Comparison of Two Silica Sources. Zeolites. 1991, 11, 672-679.
(17) Holmberg, B. A.: Wang, H.; Norbeck, J. M.; Yan, Y. Controlling Size and Yield of Zeolite Y Nanocrystals Using Tetramethylammonium Bromide. Micropor. Mesopor. Mat. 2003, 59, 13-28.
(18) Lippman, E.; Maegi, M.; Samoson, A.; Tarmak, M.; Englehardt, G. Investigation of the Structure of Zeolites by Solid-State High-Resolution Silicon-29 NMR Spectroscopy. J. Am. Chem. Soc. 1981, 103, 4992-4996.
(19) Morales-Pacheco, P.; Alvarez, F.; Bucio. L.; Dominguez, J. M. Synthesis and Structural Properties of Zeolitic Nanocrystals II: FAU-Type Zeolites. J. Phys. Chem. C. 2009, 113, 2247-2255.
(20) Subotic, B. Influence of Autocatalytic Nucleation on Zeolite Crystallization Processes. ACS Symposium series, 1989, 398, 110-123.
(21) Valtchev, V. P.; Bozhilov, K. N.; Evidences for Zeolite Nucleation at the Solid-Liquid Interface of Gel Cavities. J. Am. Chem. Soc. 2005, 127, 16171-16177.
(22) Knops-Geritis, P-P.; DeVos, D. E.; Feijen, E. J. P., Jacobs, P. A. Raman Spectroscopy on Zeolites. Microporous Mater. 1997, 8, 3-17.
(23) Fan, F.; Feng, Z.; Li, C. UV Raman Spectroscopic Study on the Synthesis Mechanism and Assembly of Molecular Sieves. Chem. Soc. Rev. 2010, 39, 4794-4801.
(24) Dutta, P. K.; Shieh, D. C.; Puri, M. Raman Spectroscopic Study of the Synthesis of Zeolite Y. J. Phys. Chem. 1987, 91, 2332-2336.
(25) Fan, F.; Feng, Z.; Li, G.; Sun, K.; Ying, P.; Li, C. In Situ UV Raman Spectroscopic Studies on the Synthesis Mechanism of Zeolite X. Chem. Eur. J. 2008, 14, 5125-5129.
(26) Valtchev, V.; Rigolet, S.; Bozhilov, K. N. Gel Evolution in a FAU-type Zeolite Yielding System at 90° C. Micropor. Mesopor. Mat. 2007, 101, 73-82.
(27) Ge. Q.; Wang. Z.; Yan, Y. High-Performance Zeolite NaA Membranes on Polymer-Zeolite Composite Hollow Fiber Supports. J. Am. Chem. Soc. 2009, 131, 17056-17057.

(28) Lassinantti, M.; Hedlund, J.; Sterte, J. Faujasite-Type Films Synthesized by Seeding. *Micropor. Mesopor. Mat.* 2000, 38, 25-34.
(29) Sandstrom, L.; Palomino, M.; Hedlund, J. High Flux Zeolite X Membranes. *J. Membr. Sci.* 2010, 354, 171-177.
(30) Weh. K.; Noack, M.; Sieber, I.; Caro, J. Permeation of Single Gases and Gas Mixtures Through Faujasite-Type Molecular Sieve Membranes. *Micropor. Mesopor. Mat.* 2002, 54, 27-36.
(31) Sato, K.; Sugimoto, K.; Nakane, T. Synthesis of Industrial Scale NaY Zeolite Membranes and Ethanol Permeating Performance in Pervaporation and Vapor Permeation up to 130° C. and 570 kPa. *J. Membr. Sci.* 2008, 310, 161-173.
(32) Kita, H.; Inoue, T.; Asamura, H.; Tanaka, K.; Okamoto, K. NaY Zeolite Membrane for the Pervaporation Separation of Methanol-Methyl Tert-Butyl Ether Mixtures. *Chem. Commun.* 1997, 1, 45-46.
(33) Kita, H.; Fuchida, K.; Horita, T.; Asamura, H.; Okamoto, K. Preparation of Faujasite Membranes and their Permeation Properties. *Sep. Purif. Technol.* 2001, 25, 261-268.
(34) Li. S.; Tuan, V. A.; Falconer, J. L.; Noble, R. D. X-Type Zeolite Membranes: Preparation, Characterization, and Pervaporation Performance. *Micropor. Mesopor. Mat.* 2002, 53, 59-70.
(35) Asghari, M.; Mohammadi, T.; Aziznia, A.; Danayi, M. R.; Moosavi. S. H.; Alamdari, R. F.; Agand, F. Preparation and Characterization of a Thin Continuous Faujasite Membrane on Tubular Porous Mullite Support. *Desalination.* 2008, 220, 65-71.
(36) Kumakiri, I.; Yamaguchi, T.; Nakao, S. Preparation of Zeolite A and Faujasite Membranes from a Clear Solution. *Ind. Eng. Chem. Res.* 1999, 38, 4682-4688.
(37) Gu, X.; Dong, J.; Nenoff, T. M.; Synthesis of Defect-Free FAU-Type Zeolite Membranes and Separation for Dry and Moist $CO_2/N_2$ Mixtures. *Ind. Eng. Chem. Res.* 2005, 44, 937-944.

We claim:

1. A method of making microporous crystals, comprising:
   a. forming a mixture comprising NaOH, water, and one or more of an aluminum source, a silicon source, and a phosphate source, whereupon the mixture forms a gel;
   b. heating the gel for a first time period, whereupon a first volume of water is removed from the gel; and
   c. heating the gel for a second time period, during which a second volume of water is added to the gel, wherein the rate of addition of the second volume of water is between about 0.5 and about 2.0 fold the rate of removal of the first volume of water.

2. The method of claim 1, wherein the microporous crystals include aluminosilicate, silicate, aluminophosphate, or silicoaluminophosphate crystals.

3. The method of claim 1, wherein the microporous crystals comprise crystals having a faujasite or an MFI framework.

4. The method of claim 1, wherein the aluminum source comprises one or more of sodium aluminate, aluminum isopropoxide, and aluminum hydroxide.

5. The method of claim 1, wherein the silicon source comprises one or more of sodium silicate, silica and colloidal silica.

6. The method of claim 1, wherein the phosphate source comprises one or more of phosphoric acid or a phosphate salt.

7. The method of claim 1, wherein the mixture further comprises at least one alkali metal cation, alkaline metal cation or quaternary ammonium cation.

8. The method of claim 1, wherein the first volume of water is between about 15% and about 75% of the volume of water in the mixture.

9. The method of claim 8, wherein the second volume of water is between about 0.5 and about 2.0 fold the first volume of water.

10. The method of claim 1, wherein at least some of the first volume of water is collected as a condensate, and the second volume of water comprises at least some of the condensate.

11. The method of claim 1, further comprising repeating steps b. and c.

12. A method of making a microporous crystal membrane, comprising:
    a. forming a mixture comprising NaOH, water, and one or more of an aluminum source, a silicon source, and a phosphate source, whereupon the mixture forms a gel;
    b. heating the gel for a first time period, whereupon a first volume of water is removed from the gel and microporous crystal nuclei form, the nuclei having a framework; and
    c. applying the gel to a solid support seeded with microporous crystals having a framework that is the same as the framework of the nuclei;
    d. heating the gel for a second time period, during which a second volume of water is added to the gel; wherein the rate of addition of the second volume of water is between about 0.5 and about 2.0 fold the rate of removal of the first volume of water.

13. The method of claim 12, wherein the microporous crystals include aluminosilicate, silicate, aluminophosphate, or silicoaluminophosphate crystals.

14. The method of claim 12, wherein the aluminum source comprises one or more of sodium aluminate, aluminum isopropoxide, and aluminum hydroxide.

15. The method of claim 12, wherein the silicon source comprises one or more of sodium silicate and colloidal silica.

16. The method of claim 12, wherein the phosphate source comprises one or more of phosphoric acid or a phosphate salt.

17. The method of claim 12, wherein the mixture further comprises at least one alkali metal cation, alkaline metal cation or quaternary ammonium cation.

18. The method of claim 12, wherein the first volume of water is between about 15% and about 75% of the water.

19. The method of claim 12, wherein the gel is applied to the solid support after the gel has been heated for the first period of time.

20. The method of claim 12, wherein the second volume of water is between about 0.5 and about 2.0 fold the first volume of water.

* * * * *